(12) United States Patent
Manahan et al.

(10) Patent No.: US 11,456,142 B2
(45) Date of Patent: Sep. 27, 2022

(54) HAZARDOUS LOCATION COMPLIANT CIRCUIT PROTECTION DEVICES, SYSTEMS AND METHODS WITH SAFETY LOCKOUT/TAGOUT COMPONENTS

(71) Applicant: EATON INTELLIGENT POWER LIMITED, Dublin (IE)

(72) Inventors: Joseph Michael Manahan, Manlius, NY (US); Adam Ledgerwood, Syracuse, NY (US); Andrew Butler, Baldwinsville, NY (US); Graig DeCarr, Cicero, NY (US)

(73) Assignee: Eaton Intelligent Power Limited, Dublin (IE)

( * ) Notice: Subject to any disclaimer, the term of this patent is extended or adjusted under 35 U.S.C. 154(b) by 254 days.

(21) Appl. No.: 16/723,442

(22) Filed: Dec. 20, 2019

(65) Prior Publication Data

US 2020/0211803 A1    Jul. 2, 2020

Related U.S. Application Data

(60) Provisional application No. 62/785,007, filed on Dec. 26, 2018.

(51) Int. Cl.
*H01H 9/16*    (2006.01)
*H01H 85/34*   (2006.01)

(52) U.S. Cl.
CPC ............ *H01H 85/34* (2013.01); *H01H 9/168* (2013.01)

(58) Field of Classification Search
CPC .......... H02H 3/335; H02H 3/338; H02H 3/05; H01H 9/0027; H01H 9/0005; H01H 9/0038; H01H 9/042; H01H 9/046; H01H 9/167; H01H 9/168; H01H 9/26; H01H 9/281; H01H 9/0264; H01H 9/008; H01H 9/542;

(Continued)

(56) References Cited

U.S. PATENT DOCUMENTS 1,370,656 A  *  3/1921  Levin ..................... H01H 9/104
                                                200/50.13
4,404,615 A  *  9/1983  Dep ..................... H05K 9/0067
                                                206/707

(Continued)

FOREIGN PATENT DOCUMENTS

CN      106169708 B    12/2017
DE   102012110001 A1    4/2014

OTHER PUBLICATIONS

International Search Report and Written Opinion for PCT/US2019/068562; dated Apr. 1, 2020; 8 pages.

*Primary Examiner* — Bryan R Perez
(74) *Attorney, Agent, or Firm* — Baker Botts L.L.P.

(57) ABSTRACT

Hazardous location compliant solid state circuit protection devices include safety lockout components ensuring disconnection as a safeguard in the completion of power system maintenance and service tasks by responsible personnel. The safety lockout components may include a mechanical lockout interfacing with a physical lock element, an electrical lockout implemented through the controls of the solid state circuit breaker device, and combinations thereof. Visual device feedback and confirmation may be provided to personnel that the lockouts have been successfully activated, as well as successfully deactivated to reconnect and restore operation of the load side circuitry.

20 Claims, 9 Drawing Sheets

(58) Field of Classification Search
CPC ...... H01H 9/52; H01H 47/002; H01H 47/005; H01H 47/004; H01H 85/34
See application file for complete search history.

(56) References Cited

U.S. PATENT DOCUMENTS

2013/0062971 A1* 3/2013 Filippenko ............. H01H 71/70
307/143
2017/0265316 A1* 9/2017 Grunow ................. H01H 9/042

* cited by examiner

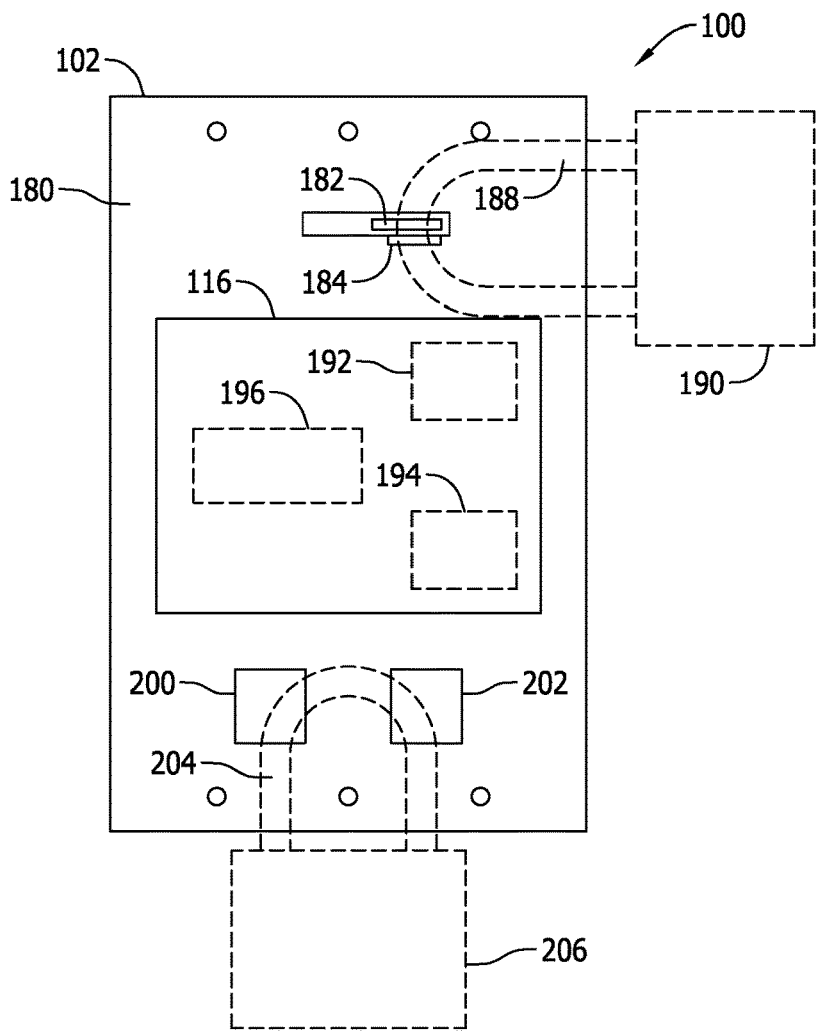
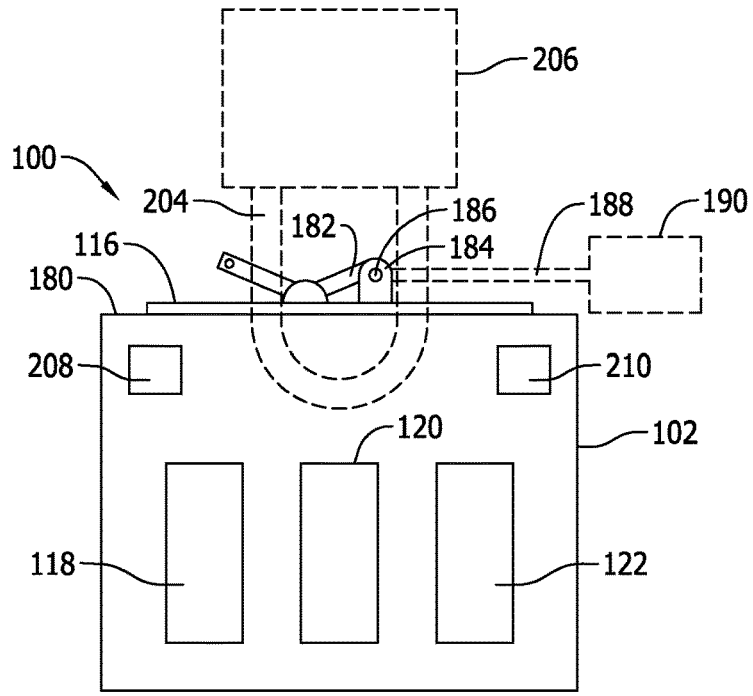

HAZARDOUS LOCATION COMPLIANT CIRCUIT PROTECTION DEVICES, SYSTEMS AND METHODS WITH SAFETY LOCKOUT/TAGOUT COMPONENTS

CROSS REFERENCE TO RELATED APPLICATIONS

This application claims the benefit of U.S. Provisional Application Ser. No. 62/785,007 filed Dec. 26, 2018, the complete disclosure of which is hereby incorporated by reference in its entirety.

BACKGROUND OF THE INVENTION

The field of the invention relates generally to circuit protection devices, and more specifically to hazardous environment compliant circuit protection devices including enhanced safety lockout features for the completion of power system maintenance and service tasks.

Various different types of circuit protection devices exist to satisfy the needs of electrical power systems providing electrical power to various electrical loads. For example, various different devices and assemblies are known that provide disconnect functionality between a power supply circuit and an electrical load. With such devices, output power may be selectively switched from a power supply either manually or automatically through such devices to facilitate service and maintenance of the electrical power system, as well as to address electrical fault conditions. Circuit breaker devices and fusible disconnect switch devices are two well-known types of devices that each provide a different capability to respond to overcurrent and electrical fault conditions and to electrically isolate load-side electrical equipment from line-side power supply circuitry, thereby protecting the load-side equipment and circuitry from otherwise damaging overcurrent conditions in the electrical power system.

While known circuit protector disconnect devices are available that satisfy the needs of many electrical systems, they remain disadvantaged in some aspects for certain types of electrical systems and applications in which the circuit protectors are located in hazardous locations. Existing circuit protector disconnect devices therefore have yet to completely meet the needs of the marketplace. Improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 4 is a front view of the circuit protection device shown in FIGS. 1 through 3 and illustrating exemplary safety lockout/tagout components therefor.

FIG. 5 is an end view of the circuit protection device shown in FIG. 4 in a disconnected state showing the safety lockout/tagout components engaged.

DETAILED DESCRIPTION OF THE INVENTION

Figure 1:
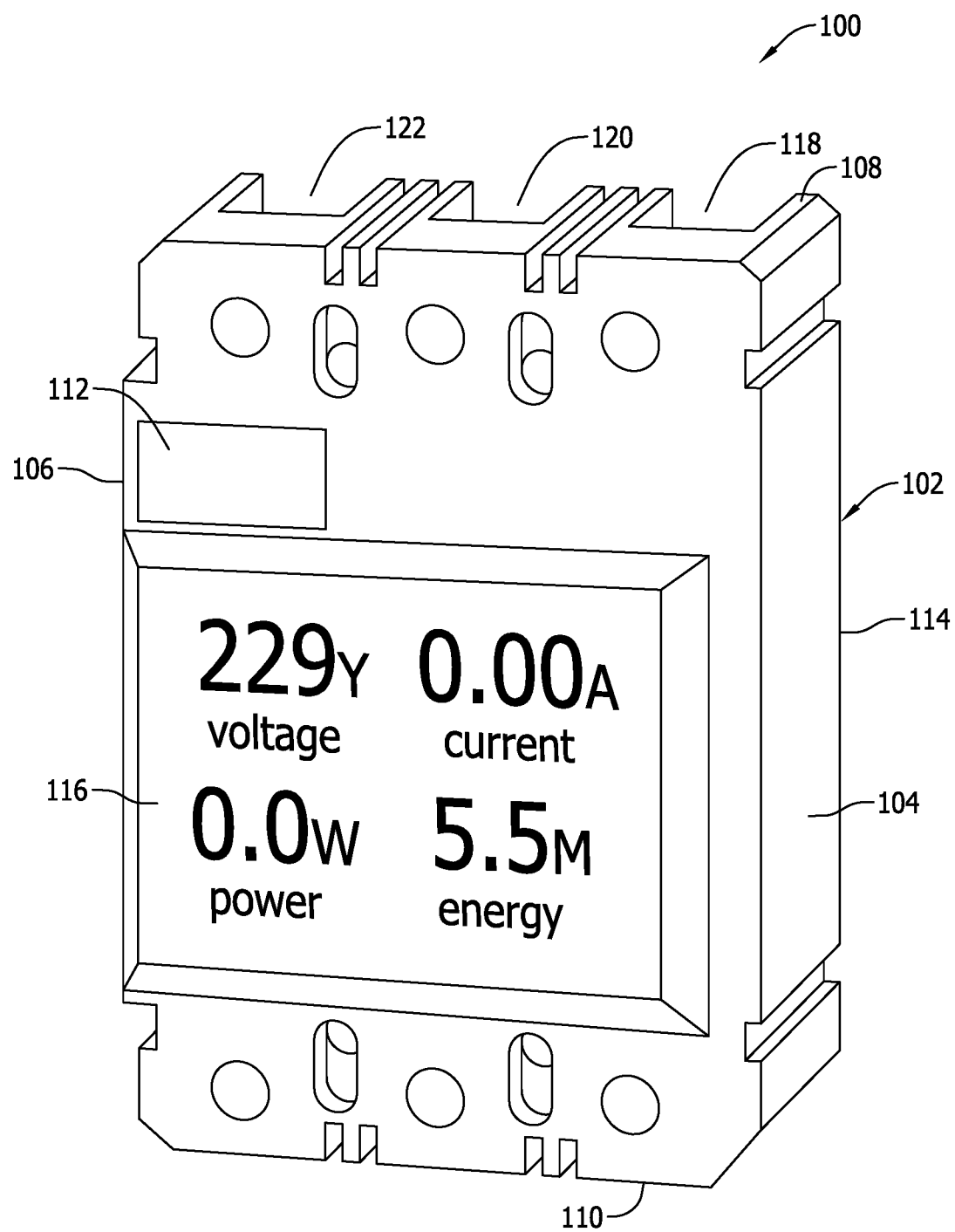
FIG. 1 is a perspective view of a compliant, hazardous location arc-less circuit protection device according to a first exemplary embodiment of the invention.

In order to understand the inventive concepts described herein to their fullest extent, set forth below is a discussion of the state of the art as it relates to issues posed by hazardous locations, followed by exemplary embodiments of devices, systems and methods addressing such issues and meeting longstanding but unfulfilled needs in the art.

I. State of the Art

Electrical power systems sometimes operate within hazardous environments presenting a risk of explosion via ignition of a surrounding gas or vapor dusts, fibers, or flyings. Such hazardous environments may arise in, for example only, petroleum refineries, petrochemical plants, grain silos, wastewater and/or treatment facilities among other industrial facilities, wherein volatile conditions are produced in the ambient environment and present a heightened risk of fire or explosion. A temporary or sustained presence of airborne ignitable gas, ignitable vapors or ignitable dust, or otherwise flammable substances presents substantial concerns regarding safe and reliable operation of such facilities overall, including but not limited to safe operation of the electrical power system itself, which in some instances by virtue of conventional circuit protector devices may produce ignition sources in normal operation and in the presence of an electrical fault. As such, a number of standards have been promulgated relating to electrical product use in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Explosion-Proof and Dust-Ignition-Proof enclosures are presently available to enclose or contain electrical products, including but not necessarily limited to circuit protection devices that are not themselves Explosion-Proof or Dust-Ignition-Proof. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of UL standard UL 1203.

The National Electric Code (NEC) generally classifies hazardous locations by class and division. Class 1 locations are those in which flammable vapors and gases may be present. Class II locations are those in which combustible dust may be found. Class III locations are those which are hazardous because of the presence of easily ignitable fibers or flyings. Considering Class 1, Division 1 covers locations where flammable gases or vapors may exist under normal operating conditions, under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Zone 0, 1, or 2 representing locations in which flammable gases or vapors are or may be airborne in an amount sufficient to produce explosive or ignitable mixtures. As defined in the IEC, a Zone 0 location is a location in which ignitable concentrations of flammable gases or vapors are present continuously or for long periods of time. A Zone 1 location is a location in which ignitable concentrations of flammable gases or vapors are likely to exist or may exist frequently because of repair or maintenance operations or because of leakage or possible release of ignitable concentrations of flammable gases or vapors, or that is adjacent to a Zone 0 location from which ignitable concentrations of vapors could be communicated.

Given that electrical devices, such as those described below, can be ignition sources in certain circumstances, explosion-proof, flame-proof, or ignition proof enclosures are conventionally provided in NEC Division 1 or 2 locations and/or IEC Zone 1 or 2 locations to house electrical devices that otherwise pose ignition risk. The terms "explosion-proof" or "flame-proof" in this context, refer to enclosures that are designed to be capable of containing an internal explosion of a specified flammable vapor-air mixture. In addition, the explosion-proof or flame-proof enclosure must operate at a safe temperature with respect to the surrounding atmosphere.

Conventional circuit breaker devices, switch devices of various types, and contactor devices are known to include input terminals connectable to power supply or line-side circuitry, output terminals connectable to one or more electrical loads, and pairs of mechanical switch contacts between the respective input terminals and output terminals. Each pair of mechanical switch contacts typically includes a stationary contact and a movable contact linked to an actuator element that displaces the movable contact along a predetermined path of motion towards and away from the stationary contact to connect and disconnect a circuit path through the device and to therefore electrically connect or disconnect the input and output terminals. When the switch contacts are opened, the device serves to isolate the electrical load(s) connected to the output terminals from the power supply connected to the input terminals. The actuator element in the mechanical switch devices described above may be automatically movable for circuit protection purposes to open the mechanical switch contacts in response to overcurrent or fault conditions in the line-side circuit and electrically isolate the electrical load(s) from electrical fault conditions to prevent them from being damaged, or the actuator element may be manually movable to electrically isolate the electrical loads from the line-side power source for energy conservation, maintenance of the load, etc.

Circuit breakers and fusible disconnect switch devices are two well-known types of devices that each provide a different type of disconnect functionality and circuit protection via mechanical switch contacts. The IEC includes the following pertinent definitions:

2.2.11
circuit-breaker
mechanical switching device, capable of making, carrying and breaking currents under normal circuit conditions and also making, carrying for a specified time and breaking currents under specified abnormal circuit conditions such as those of short circuit [441-14-20]

2.2.9
switch (mechanical)
mechanical switching device capable of making, carrying and breaking currents under normal circuit conditions which may include specified operating overload conditions and also carrying for a specified time currents under specified abnormal circuit conditions such as those of short circuit [441-14-10]
NOTE A switch may be capable of making but not breaking short-circuit currents.

2.2.1
switching device
device designed to make or break the current in one or more electric circuits [441-14-01]
NOTE A switching device may perform one or both of these operations.

It is seen from the definitions above that the circuit breaker as defined in IEC 2.2.11 and the mechanical switch as defined in IEC 2.2.9 differ in their capability to mechanically respond to abnormal circuit conditions. Specifically, the circuit breaker, as defined in IEC 2.2.11, can mechanically break short circuit conditions, whereas the mechanical switch as defined in IEC 2.2.9 cannot. Because of this, an electrical fuse is sometimes used in combination with the mechanical switch of IEC 2.2.9 to realize a fusible disconnect switch that can respond to a short circuit condition via operation of the fuse (i.e., an opening of the fuse) rather than operation of the mechanical switch contacts.

In either of the devices of IEC 2.2.11 and 2.2.9, the automatic circuit protection may sometimes be provided solely via the structural design and calibration of the circuit breaker structure or the structure of the fuse element(s) in the fuse, provided that each realizes predetermined time-current characteristics before opening of the circuit. The NEC has defined these two basic types of Overcurrent Protective Devices (OCPDs) as follows:

fuse—An overcurrent protective device with a circuit-opening fusible part that is heated and severed by the passage of overcurrent through it.

circuit breaker—A device designed to open and close a circuit by nonautomatic means and to open the circuit automatically on a predetermined overcurrent without damage to itself when properly applied within its rating.

The NEC also requires that circuits be provided with a disconnecting means, defined as a device, or group of devices, or other means by which the conductors of a circuit can be disconnected from their source of supply. Since fuses are designed to open only when subjected to an overcurrent, fuses generally are applied in conjunction with a separate disconnecting means (NEC Article 240 requires this in many situations), typically some form of a disconnect switch. Since circuit breakers are designed to open and close under manual operation, as well as in response to an overcurrent, a separate disconnecting means is not required.

In some types of circuit protection devices, automatic circuit protection may be realized via electrical sensors included in the device to monitor actual circuit conditions and, in response to predetermined circuit conditions as detected by the sensors, electromechanical trip features may be actuated to automatically open the movable contacts in response to detected overcurrent conditions including overload and short circuit conditions. Once tripped, the circuit breaker may be reset or reclosed to restore affected circuitry through the switch contacts, as the circuit breaker is designed to open the circuit without damage to itself, whereas a fuse opens a circuit via internal degradation of the fuse element(s) to the point where they can no longer carry electrical current. As such, the fuse must be replaced after opening to restore affected circuitry. Combinations of circuit breakers and fuses are also desirable in some instances, with selective coordination thereof, to extend the range of overcurrent conditions that may be addressed as well as to improve response times.

In contrast to the circuit protection devices described above, the "switching device" of IEC 2.2.1 as defined above refers merely to the making and breaking of current, without any reference to making or breaking overcurrent conditions (i.e., overload conditions or short circuit conditions). The "switching device" of IEC 2.2.1 therefore provides a disconnect function, but not a circuit protection function. IEC 2.2.1 also does not require a mechanical switching device at all, but to the extent that a switch device that is not a circuit breaker device actually includes mechanical switch contacts, it could nonetheless present an ignition risk when located in hazardous environments.

More specifically, an operation of mechanical switch contacts to make or break an energized circuit, whether manually actuated by a user under normal circuit conditions or automatically actuated under abnormal circuit conditions, presents a possible ignition source in a hazardous environment. Specifically, as the movable contacts are mechanically displaced away from stationary contacts (i.e., moved from a closed position to an opened position), electrical arcing between the switch contacts tends to result. Similar arcing may occur as the movable contacts are moved back towards the stationary contacts to reclose the device. If such arcing between the switch contacts is realized in the presence of a combustible gas, vapor or substance, the arcing may ignite the gas, vapor or substance. While the mechanical switch contacts are typically enclosed in housings provided with conventional circuit breakers or other mechanical switch devices as well as additional enclosures commonly utilized with panelboards or motor control centers, etc., such housings and enclosures are typically not sufficient to isolate electrical arcing from ignitable, airborne elements. For this reason, known devices including mechanical switch contacts are conventionally located in individual explosion-proof enclosures and again contained in an environmental enclosure, or a system of switches (i.e., a panelboard) that can in turn be installed in a single large explosion-proof enclosure without individual explosion-proof enclosures for the switches provided within an NEC Division 1 location to provide the necessary protection.

Of the devices described thus far, circuit breakers, while mechanically breaking a short circuit condition, experience the most intense arcing conditions and therefore have the greatest potential in terms of raw energy and temperature to ignite combustible gases, vapors or substances in a hazardous location. Considering that many industrial power systems and loads operate at relatively high voltage and high current, arc energy and temperatures in lower current overload conditions and normal conditions is likewise considerable and therefore poses ignition risks. In general, ignition energy resulting from the fault energy is related to the magnitude of the current being interrupted, so the higher the current being interrupted the greater the arcing potential and severity. For example, a 65kAIC interruption is much more significant from the arcing perspective, and hence more hazardous, than a 10kAIC interruption Available explosion-proof, flame-proof or ignition-proof enclosures are effective to provide safe operation of mechanical switch devices in an NEC Division 1 or 2 location or an IEC Zone 1 or 2 location, but generally impart additional costs, occupy valuable space in the electrical power system, and impose certain burdens to the installation and servicing of an electrical power system over time. Obtaining access to the disconnect devices inside the explosion-proof enclosures typically requires a time-consuming removal of a number of fasteners, and after any maintenance procedures are completed all the fasteners must be properly replaced to ensure the desired safety of the explosion-proof enclosure. During maintenance procedures, the area in which the disconnect devices are located are also typically decommissioned (i.e., disconnected) with associated load-side processes shut down to ensure safety during the maintenance procedure. Such decommissions are costly from the perspective of the industrial facility and limiting or shortening decommissioned downtime is important. It would therefore be desirable in some cases if the explosion-proof enclosures could be eliminated in an NEC Division 1 location while still providing safe disconnect functionality in hazardous environments. In order to do so, circuit protection devices designed to reduce ignition risks are needed, but at present generally do not exist.

Solid state disconnect devices are known that provide desirable disconnect functionality via semiconductor switches or semiconductor devices such as, but not limited to, insulated-gate bipolar transistors (IGBTs), Metal Oxide Semiconductor Field Effect Transistors (MOSFETs) and other known elements that electronically operate in a known manner to preclude current flow through the device and therefore electrically isolate line-side circuitry from load-side circuitry in response to predetermined circuit conditions without utilizing mechanical switch contacts. Such solid state switches may be implemented in circuit breaker devices or used in combination with fuses to address electrical fault conditions in an automatic manner.

Solid state switches beneficially eliminate electrical arcing associated with displacement of mechanical switch contacts as described above, but nonetheless still present possible ignition sources via heat generated by the solid state switches in use. Depending on the type and concentration of combustible elements in the hazardous location, the surface temperature of the solid state switch devices may rise to the point where spontaneous ignition may occur due to the flash temperature of the specific gas or ignitable substance in the hazardous location, even though no arcing occurs in the switching operation of the device.

Connecting terminals of solid state switch devices may also present reliability issues and possible ignition sources when used in an NEC Division 1 or 2 location or an IEC Zone 1 or 2 location. More specifically, the terminals may tend to loosen over time when subjected to thermal cycling or vibration. Loose terminal connections may cause overheating and possible ignition sources at the locations of the terminals, if not electrical arcing, under certain operating conditions. Poor quality terminal connections may also cause overheating of the conductor structure (sometimes referred to as the bus) in the device, presenting still further ignition concerns in hazardous locations. As such, the use of known solid state switching devices, without more, does not itself ensure sufficient safety in hazardous locations without complementary use of an explosion-proof enclosure in NEC Division 1 or 2 locations or IEC Zone 1 or 2 locations.

So-called hybrid disconnect devices are also known that include a combination of semiconductor switches or semiconductor devices and mechanical switch contacts. Such hybrid devices may likewise be implemented in circuit breaker devices or used in combination with fuses to address electrical fault conditions in an automatic manner. Hybrid disconnect devices present a mix of the issues discussed above from the perspective of possible ignition sources in a hazardous location, and adequate safety in the absence of a complementary use of an explosion-proof enclosure in NEC Division 1 or 2 location or IEC Zone 1 or 2 locations cannot be ensured.

II. Inventive Arc-Less Devices, Systems and Methods for Hazardous Location Compliance Exemplary embodiments of circuit protection devices are described herein that overcome the problems above and that provide an enhanced degree of safety for compliance with the applicable standards in NEC Division 1 or 2 location or an IEC Zone 1 or 2 location without necessarily requiring a separately provided explosion-proof, flame-proof or ignition-proof enclosure. As such, and via the elimination of separately provided explosion-proof, flame-proof or ignition-proof enclosures, the exemplary circuit protection devices described herein may be implemented in an electrical power system at reduced cost and in a reduced amount of space in electrical panels, control centers, and the like. The exemplary circuit protection devices described herein may be provided in a modular and configurable system that facilitates a more economical installation, maintenance and oversight of the electrical power system. Method aspects will be in part explicitly discussed and in part apparent from the following description.

In a first aspect, exemplary circuit protection devices may be implemented in the form of a solid state circuit protection device having arc-less operation in switching of the device to connect or disconnect load-side circuitry through the solid state switch device, in combination with enhanced features to address possible ignition sources at the connection terminals, and/or including thermal management features to address potential overheating of conductive elements internal to the solid state switch device. When implemented in the form of a solid state circuit breaker device, such solid state circuit breakers, unlike conventional circuit breakers, therefore comply with hazardous location standards applicable to NEC Division 1 or 2 locations or IEC Zone 1 or 2 locations and thus render conventional explosion-proof, flame-proof or ignition-proof enclosures obsolete for certain applications.

In a second aspect, exemplary hazardous location compliant solid state circuit breaker devices may be provided with a safety lockout/tagout mode that ensures disconnection through the solid state circuit breaker devices as a safeguard in the completion of power system maintenance and service tasks by responsible personnel. In different embodiments, the safety lockout/tagout mode may feature a mechanical lockout interfacing with a physical lock element, an electrical lockout implemented through the electronic controls of the solid state circuit breaker device, and combinations thereof. Visual device feedback and confirmation may be provided to personnel that lockout conditions have been successfully activated to disconnect the load-side circuitry so that workers may safely proceed to perform the applicable maintenance or service procedures on the load-side of the device in a safe manner. Visual feedback and confirmation may be likewise provided to personnel that the lockouts have been successfully deactivated to complete a tagout procedure and reconnect and restore operation of the load side circuitry.

In a third aspect, a hybrid circuit protection device may be implemented in the form of a combination solid state switching device and a mechanical switch device, and further in combination with enhanced features to isolate electrical arcing between the mechanical switch contacts from the ambient environment to prevent ignition, as well as addressing possible ignition sources at the connection terminals and/or including thermal management features to avoid potential overheating of conductors in the hybrid device. Such hybrid circuit protection devices, unlike conventional hybrid circuit protection devices, therefore comply with hazardous location standards applicable to NEC Division 1 or 2 locations or IEC Zone 1 or 2 locations and render conventional explosion-proof enclosures obsolete for certain applications.

In a fourth aspect, exemplary hazardous location compliant hybrid circuit protection devices may be provided with a safety lockout/tagout mode that ensures disconnection through the hybrid circuit protection devices as a safeguard in the completion of power system maintenance and service tasks by responsible personnel. In different embodiments, the safety lockout mode may feature a mechanical lockout interfacing with a physical lock element, an electrical lockout implemented through the controls of the solid state circuit breaker device, and combinations thereof. Visual device feedback and confirmation may be provided to personnel that the lockout conditions have been successfully activated to disconnect the load-side circuitry so that workers may safely proceed to perform the applicable maintenance or service procedures on the load-side of the device in a safe manner. Visual feedback and confirmation may be likewise provided to personnel that the lockouts have been successfully deactivated to complete a tagout procedure and reconnect and restore operation of the load side circuitry.

While the following discussion is made in the context of circuit breaker devices, the inventive concepts below are not necessarily limited to circuit breaker devices and instead may broadly accrue to other types of devices, examples of which are discussed above, that present similar issues from the perspective of ignition concerns in a hazardous location. Likewise, while the inventive concepts are described in the context of hazardous locations such as NEC Division 1 and 2 locations or IEC Zone 1 or 2 locations, the benefits of the concepts described are not necessarily limited to NEC Division 1 or 2 locations or IEC Zone 1 or 2 locations and instead may more broadly apply to other types of hazardous environments, and in some aspects may be beneficially provided for use in non-hazardous locations as desired.

FIG. 1 is a perspective view of a compliant, hazardous environment circuit protection device 100 according to a first exemplary embodiment of the invention. The circuit protection device 100 includes a housing 102 having opposing longitudinal sides 104, 106 and opposing lateral sides 108, 110 arranged generally orthogonally with respect to the longitudinal sides 104, 106. The housing 102 also includes a front side 112 and a rear side 114, and the front side 112 may include an optional digital display 116 that functions as a user interface for the device 100. As shown the display 116 visually indicates voltage, current, power and energy readings to a person in the vicinity of the device 100 and display 116.

The housing 102 of the device 100 is fabricated from strategically selected or otherwise custom formulated materials to withstand all possible electrical operating conditions, and specifically all possible electrical fault conditions including simultaneous fault conditions that may be presented by the electrical power system being protected in a NEC Division 1 or 2 location or an IEC Zone 1 or 2 location.

For compliance in an NEC Division 1 location or an IEC Zone 1 or 2 location, the housing structure and housing material must likewise be further formulated to provide adequate strength to withstand shock and impact forces that may be realized in an explosive environment, as well as to provide chemical resistance to withstand exposure to chemicals in the explosive environment that could otherwise negatively impact the integrity of the device 100. As used herein, "chemical resistance" refers to the strength of the housing material to protect against chemical attack or solvent reaction. Chemical resistance in the housing 102 is the opposite of chemical reactivity that may cause an undesirable chemical effect when the housing 102 is exposed to certain chemicals and/or that my undesirably generate heat and raise the temperature of the housing 102. Chemical resistance, via little or no reactivity to specified chemicals, relates to the resistivity of the housing 102 to corrosive or caustic substances in the environment, including but not limited to airborne gases and vapors. For the device 100, chemical resistance is important to all materials and structure that contributes to the hazardous location compliance described herein.

UL 1203 defines chemical testing that may be applied to determine whether any formulation of a candidate material for the housing 102 is chemically resistant for explosive environment locations. Specifically, UL 1203 chemical testing requires sample housings to be fabricated from the formulation of candidate material in the housing structure desired, and a lengthy exposure of the sample housings to saturated vapors in the air including a number of specified chemicals for a predetermined period of time. The specified chemicals for UL 1203 chemical testing include acetic acid, acetone, ammonium hydroxide, ASTM reference fuel C, diethyl ether, ethyl acetate, ethylene dichloride, furfural, n-hexane, methyl ethyl ketone, methanol, 2-nitropropane, and toluene. Different sample housings are exposed to each chemical for a predetermined period of time, and after exposure to each chemical, the sample housings are inspected to ensure that the housing structure of the samples is not compromised or shows signs of degradation via, for example, discoloration, swelling, shrinking, crazing, cracking, leaching, or dissolving. Sample housings that pass inspection are then subjected to a crush test and compared to the results of crush testing prior to the chemical exposure. If the crushing force of the chemically tested sample housings shows that the chemically tested sample housings withstand at least 85% of the corresponding crush force as tested prior to the chemical exposure, the sample housings are UL 1203 compliant.

The housing 102, via the material from which it is fabricated, should likewise exhibit chemical compatibility with specific chemicals present in a given NEC Division 1 or 2 location or an IEC Zone 1 or 2 location. Chemical compatibility refers to the stability of the housing when exposed to substances in the hazardous location environment. If the housing 102 chemically reacts to a substance in the environment, it is considered incompatible. Accordingly, compatibility testing is nonetheless advisable to confirm chemical compatibility in view of the number of different corrosive or caustic chemicals and substances used across the spectrum of industrial facilities. Different facilities involving different caustic or corrosive substances may demand housings of different materials to address issues presented. Strategic selection and custom formulation of housing materials may be needed for some explosive environments if a universally optimal housing or material formulation cannot be practically determined or economically provided. In some cases, UL 1203 compliance for the housing may obviate a need for chemical compatibility testing in selected facilities, and chemical compatibility testing may accordingly be considered optional.

The material used to fabricate the housing 102 may likewise be strategically selected or otherwise formulated, as well as formed with specific structure, to achieve thermal management and surface temperature goals for the device 100 in operation. Some housing materials may exhibit better thermal performance to distribute and dissipate heat than other materials. For example, specific polymeric resins may be selected or customized, and formulated or processed to realize a housing 102 that will improve thermal performance of the device 100 in use when protecting the electrical power system, both internally to the housing 102 and on its outer surface area such that the outer surface area temperature is maintained at a level below the temperature which could cause ignition in an NEC Division 1 or 2 location or an IEC Zone 1 or 2 location.

For any given housing material, the shape and form factor of the housing 102, including dimensions, contours, etc. may vary the overall thermal performance and surface temperature positively or negatively. For instance, for a given device rating and operating voltage and current of the electrical power system, a housing having a larger outer surface area will generally reduce surface temperature in use as compared to a housing having a smaller outer surface area. The housing structure can be designed to optimize and balance overall package size and configuration with thermal performance.

In some embodiments, the housing 102 may be fabricated from metal or metal alloys, non-metallic insulative materials such as high strength, high performance plastics, or combinations of metallic and non-metallic materials to vary thermal performance and the other considerations above, namely impact resistance and chemical resistance. Encapsulated housing constructions, in whole or in part, are likewise possible. In some instances, the interior of the housing 102 may likewise be filled in whole or in part with dielectric material, dielectric fluid, potting materials, or other filler media such as sand to contain, absorb or dissipate heat and energy of energized electrical conductors and switch components in the device 102 to unsure that the surface temperature of the housing 102 will remain below a selected target temperature to provide a device 100 having a desired temperature classification or temperature rating.

Apart from the materials utilized in its fabrication, the structure of the housing 102 could likewise be designed with heat distribution and dissipation in mind. The housing can be structured strategically to include more than one housing material throughout or at specifically targeted locations in the housing 102. Housing sub-structures could be independently fabricated and provided for assembly to provide additional thermal insulation or thermal conductivity in desired areas of the housing to selectively confine and distribute heat in a strategic manner in select locations. Wall thickness of the housing 102 could likewise be varied to provide greater or lesser degrees of thermal conductivity and heat dissipation in selected portions of the structure or in certain areas of the housing structure at the most desirable locations. Piping, channels, or pockets may be formed to strategically capture generated heat and direct it more efficiently to desired locations for dissipation. Heat sink materials and the like may be included to improve thermal absorption and dissipation.

Active cooling elements are likewise possible in which cooling fluids are passed over or through the housing structure, with the housing structure including appropriate structure to facilitate active cooling. Active cooling elements could be self-contained or separately provided such as in a panelboard application where a number of devices 100 may be provided, with an active cooling system countering the cumulative generation of heat in closely positioned devices 100 and alleviating temperature effects that the devices 100 may have upon one another. The active cooling system may include cooling fans or pumps which circulate fluids in or around a number of devices 100 to effectively manage surface temperatures. The devices 100 including temperature sensors 158 (FIG. 3) may provide feedback signals to an active cooling system to power on when needed and otherwise be powered off. Thermal electrics may also be deployed as may feedback loops with the load equipment to reduce available current through the device (thereby reducing heat).

The above thermal management considerations may be pursued in various different combinations, some of which may counteract or obviate a need for other of the considerations. For example, active cooling in some applications may obviate a need for certain features of the housing described, such as a more sophisticated shape and form factor to dissipate heat over a relatively complex surface area.

The lateral sides 108, 110 of the housing 102 each include connection recesses 118, 120, 122 for respective connection to line-side and load-side circuitry. In the example shown in FIG. 1, three connection recesses 118, 120, 122 are provided for respective connection to a three phase power supply on one of the sides 108, 110 and to three phase load-side equipment on the other. The power supply and load may each operate with alternating current (AC) or direct current (DC). The device 100 as shown is configured as a circuit breaker and therefore provides automatic circuit protection in response to predetermined overcurrent conditions, which may be selected by the user within a certain range input to the device 100 via the display screen 116, via another user interface including a remote interface, and/or pre-programmed into the device. The device 100 may operate according to specified time-current curves or trip profiles suitable to provide adequate protection for connected loads.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for interactive by a user in relation to the display. An input selector such as a toggle switch may also be provided separately from the display 116 to serve as manually operable on/off switches that may intuitively be manually operated by a user. In this case, the toggle switch may emulate a traditional toggle switch to affect a change of state to "on" or "off", it may do so without displacement of mechanical switch contacts because, as explained below, the device 100 does not include mechanical switches. Alternatively, an on/off feature may be built into the display 116 for convenient use by an operator to achieve disconnect switch functionality to connected load side equipment.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for user input in relation to prompts or information presented on the display 116. It is recognized, however, that the display or array of displays 116 can be considered optional in certain embodiments and need not be included at all. In further embodiments, additional input/output elements may be provided, whether in the form of a display or other interfaces for user interaction with the device both locally and remotely.

Figure 2:
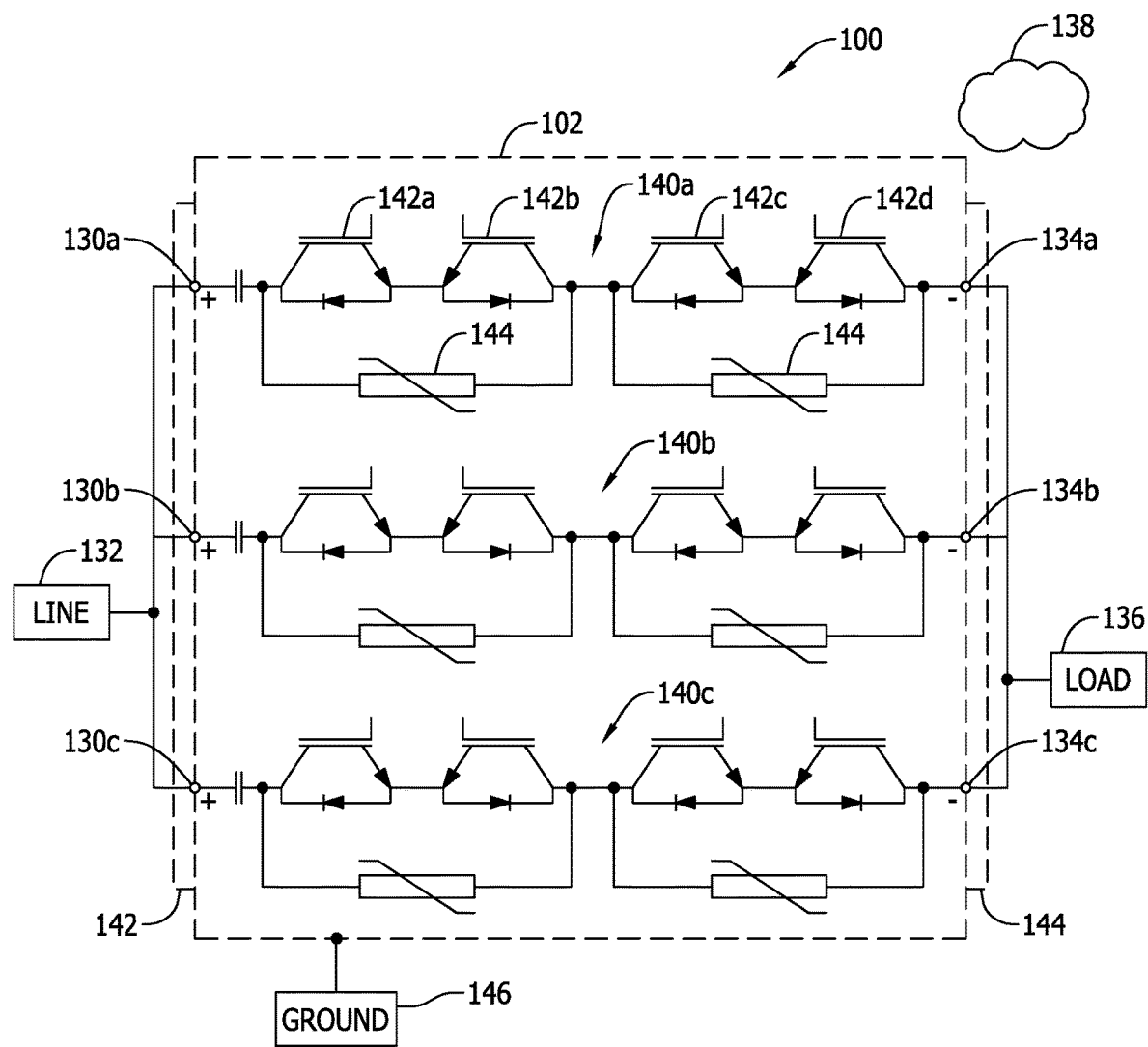
FIG. 2 is a simplified schematic diagram of the circuit protection device shown in FIG. 1 in an exemplary solid state configuration.

FIG. 2 is a simplified schematic diagram of the circuit protection device 100 in an exemplary solid state configuration. The device 100 includes input terminals 130*a*, 130*b*, 130*c* each connected to one phase of a three phase power supply indicated as line-side circuitry 132 in FIG. 2 via connecting cables, conduits, or wires. The device 100 further includes output terminals 134*a*, 134*b*, 136*c* each connected to load-side circuitry 136 such as motors, fans, lighting devices, and other electrical equipment in an industrial facility wherein ignitable gas, vapors or substances may be airborne as indicated at 138. The output terminals 134*a*, 134*b*, 136*c* may likewise connect to the electrical loads via connecting cables, conduits, or wires. Optionally, the device 100 may further include additional elements such as auxiliary contacts and auxiliary connections, shunt trip features, undervoltage release features, communication ports and communication elements, power ports for communication and other purposes, etc.

In between each pair of input terminals 130*a*, 130*b*, 130*c* and output terminals 134*a*, 134*b*, 136*c* are solid state switch devices arranged as indicated at 140*a*, 140*b* and 140*c*. The exemplary arrangement includes series connected pairs of insulated-gate bipolar transistors (IGBTs) 142*a*, 142*b*, 142*c*, 142*d* respectively connected in reverse to one another, with each pair of IGBTs 142*a* and 142*b* and 142*c* and 142*d* including a varistor element 144 connected in parallel to the IGBTs. The reversed connected IGBTs in each pair precludes reverse current flow through the IGBTs from the load-side circuitry 136 to the line-side circuitry 132 in a known manner.

The IGBTs 142*a*, 142*b*, 142*c*, 142*d* are one form of a semiconductor switch that is operable to either permit current flow between the respective input and output terminals 130*a* and 134*a*, 130*b* and 134*b*, and 130*c* and 134*c* from the line-side circuitry 132 to the load-side circuitry 136 or to preclude current from flowing through the device 100 such that the load-side circuitry 136 becomes electrically isolated from the line-side circuitry 132. Briefly, a positive voltage applied from the emitter to gate terminals of the IGBT causes electrons to be drawn toward the gate terminal across a body region thereof. If the gate-emitter voltage is at or above a threshold voltage, enough electrons are drawn toward the gate to form a conductive channel across the body region, allowing current to flow from the collector to the emitter. If the gate-emitter voltage is below the threshold voltage essentially no current can flow across the body region, such that by controlling the gate-emitter voltage current flow between the input and output terminals may be enabled or disabled to connect or disconnect the output terminals from the input terminals of the device 100 via the IGBTs. Equivalent types of semiconductor switch elements other than IGBT elements may likewise be employed, including, but not limited to, Metal Oxide Semiconductor Field Effect Transistor (MOSFET) elements, bipolar transistor elements, silicon controlled rectifier elements (sometimes referred to as thyristors), and the like. The number of semiconductor switch elements may be varied to be greater or less than the number shown in FIG. 2.

The varistor elements 144, connected in parallel to each pair of IGBTs in the arrangement shown, exhibit a relatively high resistance when exposed to a normal operating voltage, and a much lower resistance when exposed to a larger voltage, such as is associated with over-voltage conditions and/or electrical fault conditions. The impedance of the current paths through the varistors 144 are substantially lower than the impedance of the IGBTs when the varistors 144 operate in a low-impedance mode, and is otherwise substantially higher than the impedance of the IGBTs. This means that in normal conditions the high impedance of the varistors 144 causes all of the current to flow through the IGBTs, but as over-voltage conditions arise the varistors 144 switch from the high impedance mode to the low impedance mode and shunt or divert over-voltage-induced current surges away from the IGBTs to the load-side 136. As over-voltage conditions subside, the varistors 144 may return to a high impedance mode. The varistors 144 beneficially allow, for example, motor inrush currents to flow through the device 100 while otherwise permitting the IGBTs to respond to overcurrent conditions after motor starting is complete. In other applications, however, the varistors may be considered optional and may be omitted.

As a further thermal management feature, the solid state switch devices (e.g., the IGBTs) in each arrangement 140a, 140b and 140c may be encapsulated with a strategically selected or otherwise formulated material to improve thermal performance of the switch devices 140a, 140b and 140c and/or improve heat dissipation and distribution in use. The encapsulation material of the solid state switch devices 140a, 140b and 140c may be the same or different from encapsulation materials included in the housing construction, and specifically are targeted to control or limit the operating temperature of the silicon in the solid state switch devices in normal circuit operation or in overcurrent conditions and electrical fault conditions to prevent overheating of the switch devices themselves or overheating of the housing 102.

While exemplary solid state switching arrangements are shown and described, others are possible to achieve solid state switching functionality in an arc-less manner. As discussed above, the solid state switching devices avoid the type of arcing that mechanical switches produce, and therefore avoid such arcing from being a possible ignition source in NEC Division 1 or 2 locations or IEC Zone 1 or 2 locations.

In view of the hazardous environment in which the device 100 is to be used, reliable termination of line-side and load-side cables to the input and output terminals is important as loose connections can generate heat and reliability issues, as well as possible ignition concerns in a hazardous location. In an NEC Division 2 or IEC Zone 1 or 2 location, the input and output terminals may be accessible from the exterior of the housing 102. Locking terminal connection assemblies and spring-biased terminal assemblies may be utilized to accept and retain ends of the respective cables, while reducing any tendency of the cable connections to loosen over time. Depending on the specific end use of the device 100 and its operating conditions, such locking terminal assemblies and spring-biased terminal connectors may, however, be considered optional in NEC Division 2 or IEC Zone 1 or 2 locations.

In an NEC Division 1 location, the input and output terminals may further be enclosed in additional housing portions to provide additional safety assurance. Such housing portions may be separately provided from the housing 102 or may be integrally formed as extensions of the housing 102 to isolate the input and output terminals from the explosive environment. In contemplated embodiments, removable cover elements may be provided to access the input and output terminals and complete electrical connections to the input and output terminals inside the enclosures of the housing portions. The line-side and load-side cable connections may further be established, for example, via armored cable and cable glands providing ingress protection, sealing and grounding to safely pass a line-side cable or load-side cable through the enclosures of each housing portion. When used with armored cable, a ground to earth path may be established via the cable gland. Armored cable is not necessary in all embodiments, however, and may not be used. Cable glands may be used with non-armored cable as well.

The housing 102 may be designed and fabricated with thermal management issues in mind to maintain surface temperatures below applicable limits for a given installation in an NEC Division 1 location, and in some embodiments the housing 102 may in whole or in part be explosion-proof in compliance with applicable standards for hazardous locations, albeit with relatively smaller and more economical housing to provide than a conventional, larger and separately provided explosion-proof enclosure that would conventionally contain the entire circuit protection device. The housing 102 and any enclosures defined therein may likewise include vacuum chambers or may filled with dielectric fluid, dielectric material or inert gas to reduce or impede electrical arcing at the terminal/cable interface or at other locations in the housing.

To address possible static electricity charge buildup, which presents a possible ignition source in an NEC Division 1 location, the housing 102 is shown in FIG. 2 with connection to electrical ground 146. Briefly, static electricity is the result of an electromagnetic imbalance between negative and positive charges in an object. Charging of the housing surface may arise via surface charge involving another object, particularly for insulative portions of the housing, or via charge induction for electrically conductive portions of the housing. Surface charging can also occur during exposure to a high voltage DC power supply, which will cause ions to adhere to the housing surface.

Regardless of how surface charging actually arises, the connection to ground 142 allows any electrical charge buildup on the housing 102 to safely dissipate without creating an ignition source in combustible/hazardous areas. The housing 102 may be grounded to earth ground or chassis ground via a line wire or line conductor connected to the housing 102 on its outer surface. As such, any charging of the exterior of the housing 102 will be quickly dissipated as electrical current to ground and obviate a high voltage discharge event, typically via a spark or shock that could be generated by a person or tool utilized by a person, that could otherwise occur in the presence of the explosive atmosphere and cause ignition.

The housing 102 itself could also be fabricated in whole in part from antistatic polymers or antistatic materials that are weakly conductive to electricity from the perspective of charge buildup, but nonetheless considered insulative and non-conductive from the perspective of the electrical power system that the device 100 is protecting. Antistatic materials may improve the housing performance relative to non-antistatic materials by reducing any tendency of the housing to charge in the first instance, and this is another consideration for strategically selecting or otherwise formulating the material(s) to be utilized in the housing fabrication. Antistatic coatings, encapsulants, or shells may be provided on the housing outer surface if desired, although chemical resistance and compatibility must still be ensured as discussed above. When the device 100 directly connects to an enclosure/system ground plane in an actual installation, dedicated ground conductors to address static electricity issues may not be necessary due to mechanical attachment and/or physical proximity to the ground plane.

While a single ground connection is shown in FIG. 2, more than one ground connection could be provided in the structure of the device 100 at any desired location. Grounding conductors may be provided interior to the device housing 102 in addition to or in lieu of a grounding conductor connecting to the exterior of the device housing 102 as described. Ground connections for the housing 102 also could be established via a cable connector such as a cable gland when armored cable that already includes a ground path to earth is utilized to make the line-side and load-side connections to the terminals 130a, 130b, 130c of the device 100. Of course, in some cases, non-armored cable could be used, with or without cable glands, while still eliminating ignition sources in the device 100 and addressing static electricity with an alternative ground connection.

In NEC Division 2 or IEC Zone 1 or 2 locations, the device 100 would typically be protected by an enclosure and therefore would not be as prone to static electricity issues and discharge events. As such, the connection to ground 146 may or may not be necessary or desirable in a device 100 for use in an NEC Division 2 location or IEC Zone 1 location and could therefore be considered optional. By virtue of the device 100, however, the enclosure containing one or more devices 100 need not be explosion-proof and the conventionally provided explosion-proof enclosure may be omitted.

Figure 3:
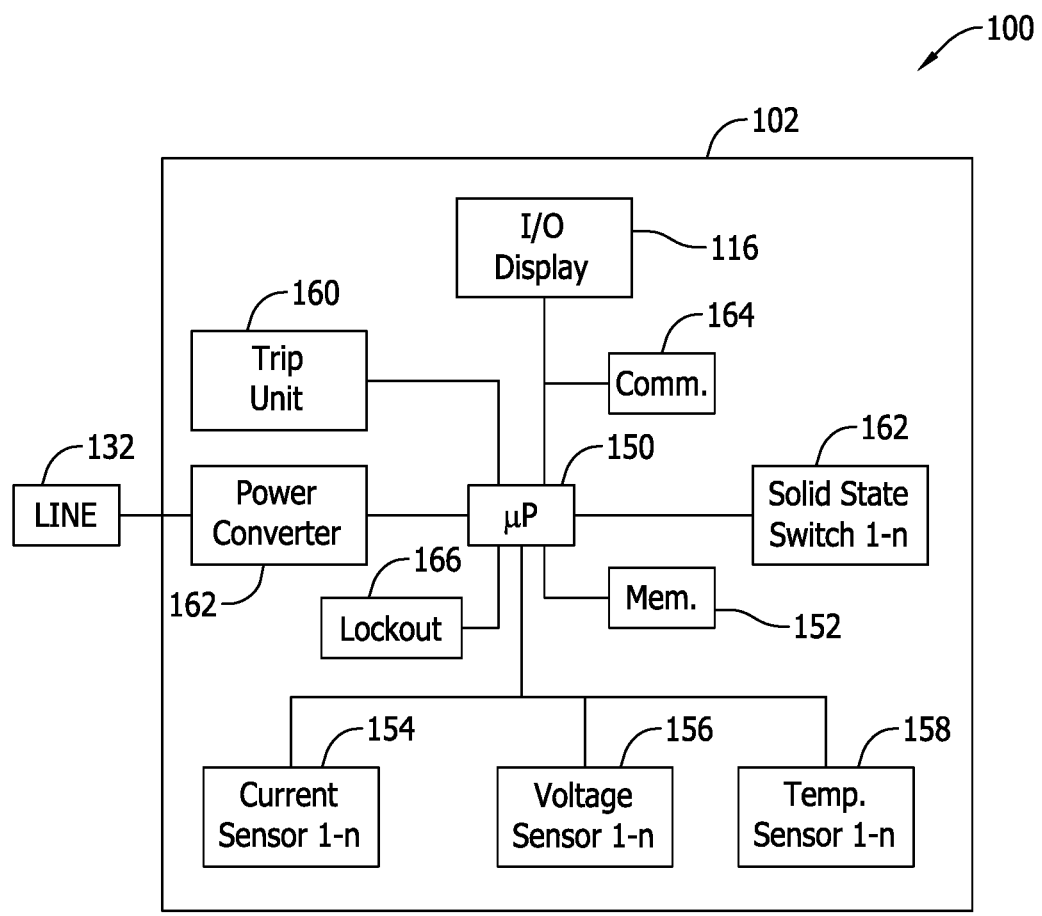
FIG. 3 is a block diagram of the circuit protection device shown in FIGS. 1 and 2.

FIG. 3 is a block diagram of the circuit protection device 100. The device 100 includes a processor-based microcontroller including a processor 150 and a memory storage 152 wherein executable instructions, commands, and control algorithms, as well as other data and information required to satisfactorily operate the device 100 are stored. The memory 152 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set (OBJ-OBJ) circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

The devices 100 also include sensors 154, 156, 158 provided in a number 1 through n that equal the number of switching poles in the device 100. As such, for the three pole device 100 shown in FIGS. 1 and 2, three sensors of each type may be included that respectively detect current, voltage and temperature at respective locations in the device to assess actual operating circuit conditions in the device. Additional temperature sensors may optionally be provided per switching pole in further embodiments for enhanced temperature monitoring at a plurality of location in each pole. The sensors 154, 156 and/or 158, in turn, provide inputs to the processor 150. Thus, the processor 150, by virtue of the sensors 154, 156 and/or 158, is provided with real-time information regarding current passing through each of the solid state devices 162 in number 1 through n that equal the number of switching poles in the device 100.

The detected current is monitored and compared to a baseline current condition, such as a time-current curve or time-current profile that is programmed and stored in the memory 152 or the trip unit 160. By comparing the detected current with the baseline current condition, decisions can be made by the processor 150 to control the solid state switching elements 162, by controlling an output voltage to the gate-emitter voltage in the IGBT's described above, to cease conducting current to protect the load-side from damaging currents. In some embodiments, the trip unit 160 allows the user to select settings for the operation of the trip unit 160 and alter the time-current response of the device 100 within predetermined limits. As one such example, a user may select a current rating of the device 100 at a value from 50A to 100A, with the trip unit 160 applying the appropriate time-current curve for the selected current rating.

The detected voltage may likewise be monitored and used to make control decisions whether to operate the solid state switching elements 162 to protect the load-side circuitry and components from adverse operating conditions. Since voltage and current are related, detected voltage can be compared to detected current to facilitate an assessment of the health of the device 100, identify errors, and facilitate diagnosis and troubleshooting of the electrical power system. As other failsafe measures, voltage and current can be calculated from sensed parameters and compared to the sensor feedback to detect error conditions.

The detected temperature may likewise be monitored and used to make control decisions whether to operate the solid state switching elements 162 to protect the load-side circuitry and components from adverse operating conditions. Additionally, the detected temperature may ensure that conductors in the device 100 are operating below rated temperatures for the particular hazardous location in which it resides. For example, if the rated temperature is 200° F., the processor 150 can operate the solid state switches to disconnect and cease current flow when the operating temperature as indicated by the temperature sensors has risen to near 200° F. that could ignite airborne gases, vapors or substances in NEC Division 1 or 2 locations or IEC Zone 1 or 2 locations.

The processor 150 is in communication with the input/output display 116 to provide feedback to a user and to accept inputs made via the display 116.

In the example shown, the processor 150 receives line-side power through power converter circuitry 162. The power converter circuitry 162 includes step down components and analog to digital conversion components when necessary to supply direct current (DC) power to the processor 150 at reduced voltage in a known manner. Conversion of the line power to appropriate levels to power the electronics avoids any need for an independent power supply, such as batteries and the like or a separately provided power line for the electronic circuitry and controls that would otherwise be necessary, although in some embodiments such an independent power supply may indeed be included if needed or as desired. The controls described may be implemented on a circuit board or circuit boards in various arrangements of electronic packages, with algorithmic control features programmed and stored in the device memory.

A communication element 164 is also included that may communicate data to a remote location, as well as other device 100 as described further below to assess operation of the larger electrical power system in local and remote locations relative to any particular device 100. Wireless and non-wireless communication of data of interest, including but not limited to current data, voltage data (including waveform data), temperature data, on-off status data of the solid state switching elements, selected setting data, trip time data, etc. is possible, and such data may be stored and archived locally and remotely for analysis of the electrical power system over time. Remote actuation of the device 100 is also possible via the communication element 164.

While an exemplary architecture of the device 100 has been described, it is understood that certain elements shown in FIG. 3 may be considered optional to provide more basic functionality. Moreover, additional elements could be added to realize still further sophistication and intelligence in the operation of the device 100, as well as to provide additional functionality beyond circuit protection and disconnection functionality.

The solid state device 100, because it does not include mechanical switch contacts to connect and disconnect the load-side circuitry through the device 100, is generally incompatible with conventional safety lockout or safety tagout features commonly employed in mechanically actuated switch devices to ensure that disconnection is maintained while workers are performing maintenance or service tasks on the load-side of the device 100. Safety lockout or safety tagout features avoid risks of possible electrocution to workers by preventing re-connection of the load-side circuitry through the device 100 except when proscribed procedures are followed.

As conventionally implemented, mechanically actuated disconnect devices are physically locked out via a padlock or other mechanical locking device in manner that physically prevents the closure of the mechanically actuated disconnect device pending completion of the maintenance or service tasks to ensure worker safety on the load-side of the device. Typically, access to a mechanical unlocking device, such as a key or special tool needed to unlock the device and allow reclosure of the mechanical switch contacts in the device is conventionally restricted only to a particular person or persons having supervisory authority and specific training in properly completing a safety tagout procedure to unlock the device for reclosure of the circuitry.

Likewise, and as conventionally implemented, in some cases a number of physical locks are used in combination to mechanically lockout a conventional mechanically actuated switch device in an opened position to prevent the mechanical switch contacts from being reclosed while maintenance and service procedures are being performed. Each of the physical locks provided may only be unlocked or tagged out by a different person with a unique key, such that a combination of persons is needed to remove all of the locks before the device can be reclosed. Such conventional safety lockout/tagout procedures using physical locking devices are effective to ensure that unintentional or inadvertent closure of a conventional mechanically actuated device cannot be made while maintenance and service tasks are being completed.

The device 100, via the elimination of mechanically actuated switch contacts of conventional devices, accordingly requires new lockout/tagout features and associated safe mode of operation to provide a commensurate degree of lockout/tagout safety assurance to ensure worker safety and manage ignition risks in a hazardous location. The device 100 therefore includes a lockout component, represented as lockout 166 in FIG. 3. The lockout component 166 may, as described next, correspond to one or more lockout components that may respectively be monitored by the processor 150, implemented electronically via the processor 150 and device controls, or assisted or confirmed electronically through the processor 150 and controls of the device 100.

While the lockout component 166 and corresponding lockout components are described below in the context of and in combination with the device 100, which unlike conventional devices is advantageously designed to realize enhanced safety while operating in hazardous locations, the benefits and advantages of the lockout components described herein extend more generally to other types of switching disconnect devices and end-use applications that pose similar electrocution risks or ignition risks in the maintenance and service of electrical loads and load-side circuitry that either require safety lockout or safety tagout features, or render safety lockout/tagout features and procedures desirable.

As such, the device 100 including the inventive lockout components disclosed herein is provided primarily for the sake of illustration rather than limitation. The lockout components described herein may be generally employed in any circuit protection device or disconnect device desired for the purpose of meeting applicable standards and regulations relating to worker safety in and around an energized electrical power system. Such standards and regulations may include, for example only, OSHA safety requirements for "Control of Hazardous Energy" (29 CFR 1910.147) and NFPA standards 70E and 79 providing guidance to verify that any stored energy has been properly eliminated or controlled to ensure personnel will not be injured or come in contact with electrical or mechanical energy when performing tasks. Remote actuation of circuit protection devices, disconnect devices and switching devices creates additional risk that a service person could be electrocuted in the absence of a lockout device, so it is imperative that the lockout provisions prevent all opportunities for energization of the circuit regardless of input type.

Figure 6:
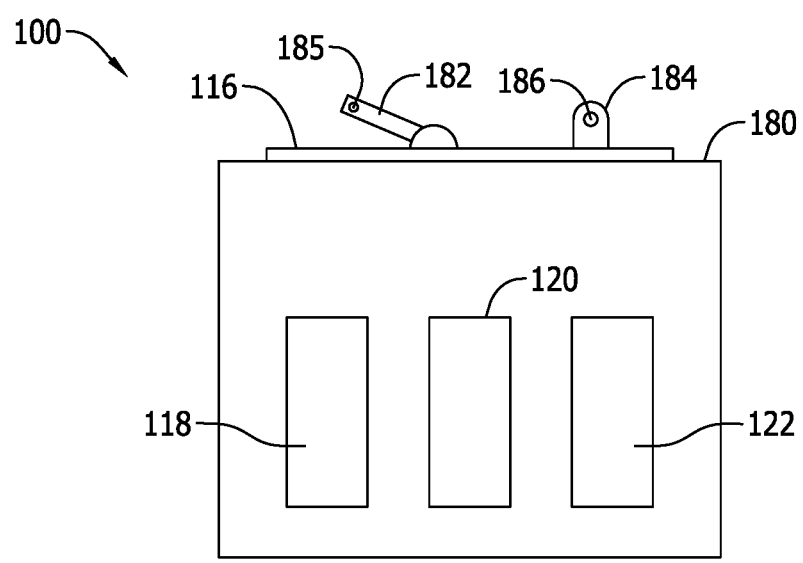
FIG. 6 is an end view of the circuit protection device shown in FIG. 4 in the connected state with the exemplary safety lockout/tagout components disengaged.

FIG. 4 is a front view of the circuit protection device 100 illustrating exemplary safety lockout components that may be used separately or in combination to realize secure safety lockout features and functionality. FIG. 5 is an end view of the circuit protection device 100 with the exemplary safety lockout components engaged. FIG. 6 is an end view of the circuit protection device 100 in the connected state with the exemplary safety lockout features disengaged. By virtue of the lockout components and features provided, the device 100 may securely be held or maintained in the off or disconnected state via the lockout components with the load-side circuitry electrically isolated from the line-side circuitry by the solid state switches in the device 100. While the device 100 is in the lockout state, mode or condition, unless proscribed tagout procedures are followed the device 100 cannot be inadvertently turned back on to its connected state while workers are performing needed tasks on the electrical loads and load-side circuitry connected through the device 100. Safety assurance is therefore provided that the device 100 stays disconnected pending completion of maintenance and service tasks on the load-side of the device 100.

As shown in FIGS. 4-6, the front face 180 of the device 100 includes the display 116 and a mechanical toggle switch 182 adjacent to the display 116. In contemplated embodiments, either the display 116 or the toggle switch 182 may be utilized to achieve an on/off change of state of the solid state switching elements in the device 100, although in some embodiments the device 100 may alternatively be provided with one or the other, but not both of the display 116 and the toggle switch 182.

The mechanical toggle switch 182 may be selectively positionable on the front face 182 of the device between designated "on" and "off" positions. More specifically, the mechanical toggle switch 182 in the example shown may be rotated back and forth a bit less than 180° (although embodiments are contemplated wherein a toggle switch may rotate about 90° or even less) from one another about an axis of rotation of the mechanical toggle switch 182 between the designated on and off positions. The "on" position in a contemplated example is shown in FIG. 6 and in phantom in FIG. 5, while FIGS. 4 and 5 show the toggle switch 182 in the "off" position. The toggle switch 182 serves as an intuitive and easily used mechanical input selector for a user to turn the device on or off as desired while also providing visual indication to the user based on the position of the mechanical toggle switch 182 whether the device 100 is on or off.

The mechanical toggle switch 182 mimics an on/off operation of known devices including a similar toggle switch input selector, but without any mechanical actuation of switch contacts. As such, a repositioning of the mechanical toggle switch 182 in the device 100 does not cause any mechanical actuation of mechanical switch contacts as none are provided in the device 100. Additionally, a repositioning of the mechanical toggle switch 182 does not directly operate the solid state switches in the device 100 to effect a desired off (disconnection) or on (connection) function. The mechanical toggle switch 182 serves instead only as a user input to the electronic controls of the device 100 to achieve electronic change of state of the solid state switches inside the device 100 to achieve the desired on/off or connect/disconnect functionality. Based on the position of the toggle switch 182, which may be sensed, otherwise detected or communicated to provide a control input to the processor 150 (FIG. 3). The processor 150 or a device controller is responsive to the toggle switch position to apply (or not) sufficient gate-emitter voltages to the solid state switching elements to conduct electrical current (or not) and realize the desired on or connected state, or alternatively the desired off or disconnected state depending on the position of the toggle switch.

The mechanical toggle switch 182 may be safely locked out at a distal end thereof in the off position to an anchor element 184 provided in the device 100 and projecting upward from the front face 180 adjacent to the distal end of the toggle switch 182 when in the off position. Specifically, the distal end of the toggle switch 182 may include a first lock aperture 185 (FIG. 6) that aligns with a second lock aperture 186 (FIGS. 5 and 6) of the anchor element 184. When the lock apertures 185, 186 are aligned, a locking element such as, for example, a shank 188 of a padlock 190 (shown in phantom in FIGS. 4 and 5) may be inserted through the aligned lock apertures 185, 186 to physically lock the mechanical toggle switch 182 in the off position. The locked mechanical toggle switch 182 is an effective safety lockout of the device 100 to ensure that the device 100 remains in the disconnected state electrically isolating the load-side of the device 100 from the line-side circuitry.

The anchor element 184 may be provided as a metal plate or reinforced plastic element in contemplated embodiments that is securely mounted to the device 100 and has sufficient structural strength to resist any attempt to remove the lock by force. More than one anchor element 184 may be provided as desired to improve the lockout arrangement further. While an exemplary anchor element 184 is shown and described, other anchor elements are possible in further and/or alternative embodiments, with the end result being secure locking of the on/off input selector in the off position to prevent the device 100 from being turned back on.

By virtue of the exemplary toggle switch 182 and anchor element 184, the device 100 may be safely locked out as described above to ensure that the device 100 to ensure the safety of workers attending to load-side maintenance procedures. The padlock 190 may be opened to unlock the toggle switch 182 only by an authorized person having a key, such that a person without the key cannot turn the device 100 on via the toggle switch 182 that is locked in the off position. While a toggle switch 182 and padlock 190 are described and illustrated to obtain a simple locking arrangement, on/off input selectors other than toggle switches and locking elements other than padlocks could likewise be utilized with similar effect to realize a mechanical lockout for the otherwise non-mechanical nature of the solid state device 100 in the switching disconnect operation.

As mentioned, the mechanical toggle switch 182 may be utilized as a stand-alone on/off switch input selector including safety lockout capability described, or may be used in combination with the display 116. When the toggle switch 182 and the display 116 are each provided, the display 116 may provide visual user feedback to the user when the toggle switch 182 is being moved between the on and off positions and provide another visual cue to a user regarding the state of the device as being on/connected or off/disconnected. Specifically, when the mechanical toggle switch 182 is moved to the on position, the processor 150 can operate the solid state switches to conduct current, confirm that current is being conducted via the sensors provided in the device 100, and cause an ON indicator to be presented on the display 116 to confirm to the user that the device 100 is actually on. Also, when the mechanical toggle switch 182 is moved to the off position, the processor 150 can operate the solid state switches to become nonconductive, confirm via the sensors provided in the device 100 that the load-side terminals are electrically isolated, and cause an on OFF indicator to be presented on the display to 116 confirm to the user that the device 100 is actually off.

When confirmation is provided to the user of the actual on or off state of the device 100, additional safety is provided in the event of a device control malfunction or a solid state switch malfunction. In such a scenario, the mechanical toggle switch 182 may be moved to the off position but the solid state switches remain "on" to conduct current to the load-side. The display 116, in response to such a condition, which can be detected with the load-side sensors on the device 100, can provide a clear warning on the display 116 that the device 100 is not actually "off" as the user intended via moving the toggle switch 182 to the opened or off position. Alerts and notification may also be generated of an error condition for the device 100, and if needed, the line-side circuitry can be electrically isolated, locally or remotely, via operation of an upstream switch device in the electrical power system to ensure worker safety in completing needed, load-side tasks.

While confirmatory on/off status indication is described via the display 116, indicator lights and other confirmation/feedback features may also be utilized to provide confirmation to the user of the actual state of the solid state switches as on or off, or to effectively warn users of detected device errors or malfunction, either in addition to or in lieu of the display 116. Audio alert features may be provided in some embodiments as enhanced confirmation or warning features using verbal messages such as "Device On", "Device Off" or "Warning, Device Remains On", "Warning, Device Remains Off". Confirmation or warning data messages may also be automatically generated and communicated to remote devices for system level assurance, analysis and record keeping purposes to log connections and disconnections made through the device, time of connection and disconnection, sensor and mechanical toggle switch states, or other data of interest.

In embodiments that do not necessarily include the mechanical toggle switch 182, the display 116 may be touch sensitive and may define an on/off button 192, a safety lockout button 194, and a lockout deactivation element 196. The on/off button 192 may be used for ordinary on/off change of state operation of the device 100 with the controls of the device 100 accordingly controlling the solid state switches without requiring the toggle switch 182 or other mechanical input selector. Audio and/or visual feedback may be provided to the user confirming that the device 100 is actually on or off, or that an error has been detected in which a warning is appropriate.

When the display 116 is touch sensitive, graphical icons may be provided in a home screen display and in successive displays as users make input selections, and user interface selections may be provided in menus or sub-menus. A home screen button may be provided adjacent the display 116, and the on/off switch may be provided on the home display for convenient access. Users may touch, swipe, or utilize other forms of contact in operating the display 116 in the style of other types of smart devices (e.g., smart phones or tablets) in an easy to use display-driven interface. When a user turns the device 100 off via the on/off input selector in the home screen, another screen display may be presented that includes the safety lockout button 194. Likewise, when the safety lockout button 194 is activated, another screen display may be presented that includes the lockout deactivation element 196. Numerous variations are possible in this regard.

When the mechanical toggle switch 182 is provided in addition to the display 116, a separate or independent on/off button 192 in the display 116 may be considered optional and need not be included. The display 116 could automatically switch to different screen displays including the on or off confirmation as the mechanical toggle switch 182 is moved to its on or off positions so that the user can see the device 100 responding to the user selected position of the mechanical toggle switch 182. The toggle switch 182 could be disabled from the controls perspective when the lockout is activated as further assurance that it could not be used to turn the device back on until an electronic lockout condition is properly deactivated per the discussion below.

In contemplated embodiments wherein the display 116 is not touch sensitive, additional input selectors can be provided in button form or any alternative form desired for users to select or make on/off inputs, a safety lockout input, and a lockout deactivate input, either independently from or in combination with the display 116. In contemplated embodiments, the additional input buttons may be multifunctional and may be coordinated with screen displays for intuitive device operation by a user in home screen and related screens to select different options, in a menu-driven user interface, or the input buttons may be provided with labels and the like may be provided on the device with each input button serving only one purpose only (e.g., on/off selection).

When desired, the safety lockout button 194 (or corresponding input selector) may be manipulated by a user to activate an electronic lockout feature wherein the on/off button 192 (or other corresponding input selector including but not limited to the toggle switch 182) is disabled, such that any further user manipulation of the on/off button 192 (or other corresponding input selector) is ineffective to change the state of the solid state switches in the device 100. As such, while the device 100 is off and while the lockout is enabled, any attempt by the user to turn the device 100 back on via an on/off input selector will be ignored by the device controls. As before, the actual change of state of the solid state switches in the device 100, as detected by the sensors in the device 100, may be visually confirmed for the benefit of the user, and safety warnings or error notifications can be made via the device 116 concerning possible error conditions or malfunction of the device 100. The display 116 may also visually indicate to the user that the lockout has been activated, and audio confirmation may be provided as well.

Once the lockout button 194 is activated on the display 116, the device 100 remains in the lockout state and may not be turned back on until the lockout deactivation element 196 is correctly used to tagout the locking elements and deactivate the lockout feature. In one example, when the lockout deactivation element 196 is selected by the user, a screen is presented to the user to enter a tagout passcode. Of course, in contemplated embodiments the tagout passcode would be known only to a designated person or persons authorized to turn the device back on and therefor reclose the device for resumed operation of the power system on the load-side of the device 100. Unless the proper tagout passcode is presented, the lockout will not be deactivated, and the on/off input selector will continue to be disabled and any use thereof to attempt to turn the device on will be ignored.

Such exemplary lockout activation and tagout deactivation features, implemented electronically though the display 116 and the controls of the device 100, can complement the toggle switch lockout described above or be used as a stand-alone feature. While a passcode deactivation feature has been described for the electronic lock, other known features to verify an authority of a person or known and may be utilized, including but not limited to known biometric elements to identify fingerprints and the like of an authorized person to unlock the device interface and/or to deactivate a safety lockout.

When the mechanical toggle switch 182 and the display 116 are each present in the device 100, enhanced lockout/tagout procedures are possible with even greater safety assurance than possible if only one of them is provided. For instance, one person may be required to unlock the electronic feature implemented through the display 116 with the required passcode, and another person may be required to unlock the padlock 190 with the required key to release the otherwise locked toggle switch 182 so that it can be moved to the on position to turn the device 100 back on. If the mechanical lock is disabled to release the toggle switch 182, but the electronic lock remains activated (or vice versa), the controls in the device 100 will not allow the device to be turned back on. Such a multi-step lockout/tagout procedure involving different persons is advisable in a hazardous location to reduce any likelihood of human error in operating the switch and therefore increases worker safety and possible ignition concerns if the device 100 is turned back on before maintenance and service tasks are completed on the load-side of the device 100.

As still another lockout component providing lockout/tagout safety assurance, the front face 180 of the device 100 also includes a pair of lockout openings 200, 202 that are respectively shaped, dimensioned and spaced from one another to receive a physical, mechanical locking element such as a shank 204 of a padlock 206 (shown in phantom in FIGS. 4 and 5) passing through and between each lockout opening 200, 202. Lock detention sensors 208, 210 (shown in phantom in FIG. 5) are provided to detect the insertion of the locking element (e.g., the shank 204), and when insertion of the shank 204 is detected the controls of the device 100 can disable the on/off input selector to assume a lockout state or condition. Therefore, the mechanical act of inserting the shank 204 by a user serves as an electronic control input via the lock detention sensors 208, 210 that, in turn, cause the device 100 to assume a safety lockout state.

The lock detection sensors 208, 210 in contemplated embodiments may be optic sensors or limit switches in contemplated examples, although other types of sensors are possible in further and/or alternative embodiments. Optionally, the lock detection sensors 208, 210 may be controlled so that power is supplied to them only when the on/off switch is in the "off" position, therefore avoiding unnecessary power consumption while the device 100 is turned on with the on/off switch in the "on" position. As such, the lockout can only be activated via insertion of the lock after the device 100 has been turned off. This prevents a potentially problematic lockout activation while the device 100 is on and a resultant locking out or preventing a user from turning the device off 100 without going through the proscribed lockout deactivation first, which may only be completed by certain users for the reasons above. While a lockout of the device 100 in the on state could in some cases provide a desirable security feature protecting critical loads from being inadvertently turned off by unauthorized persons, such a lockout to ensure that the device remains on or connected is an optional feature in some embodiments, although in certain instances is undesirable. Specifically, when operating in a hazardous location, the ability to quickly turn the device 100 off and disconnect the load-side when needed, without restriction and without time delay to deactivate the lockout(s) provided, is important and should not be impeded, such that safety lockout components are typically reserved only for the disconnected or off state of the device 100 in a hazardous location. Provided that a sufficient emergency over-ride or lockout bypass feature was present, however, to permit the device 100 to be readily disconnected even if it had been desirably locked in the on or connected state, such a lockout in the on state may be permissible.

Once the lock detection is made by the sensors 208, 210 the device 100 remains disconnected in the lockout state with the on/off input selector disabled as long as the lock remains in place. The padlock 206 may be opened to remove the shank 204 only by an authorized person having a key, such that a person without the key cannot remove the shank 204. Removal of the shank 204 by a designated person is likewise detected by the sensors 208, 210 causing the device controls to deactivate the lockout and allowing the device 100 to be turned on again via the on/off input selector.

The automatic lock detection and associated lockout/tagout feature can be used as a stand-alone feature or in combination with one or both of the mechanical toggle switch and electronic display-driven lockout features described above. Confirmation and user feedback of successful lockout operation, as well as notifications of errors or malfunctions can be provided as described above. When all three of the lockout features described are provided in combination, a redundant, three-step lockout/tagout procedure is facilitated that may involve three different persons to disable each type of lockout provided. The automatic lock detection and safety lockout/tagout feature can likewise be provided with either one of, but not both, of the other features described above to facilitate a two-step safety lockout/tagout procedure that may involve two different persons disable each lockout provided.

While exemplary mechanical and electronic safety lockout/tagout components and methods have been described and illustrated, further adaptations are possible. For example, mechanical locking elements other than padlocks may be utilized to lock a mechanical input selector such as the toggle switch 182 in the off position and/or inserted through lock openings in the device 100. Likewise, other types of lock detection sensors may detect other types of mechanical locking elements. Various forms of electronic lockouts may be provided using different user interfaces and security features to ensure that safety lockouts are successful for the solid state device 100 that do not include mechanically actuated switches, while ensuring that the safety lockouts may be deactivated only by authorized persons, and also ensuring that additional ignition concerns of hazardous locations are adequately addressed in the operation of the device 100.

Figure 7:
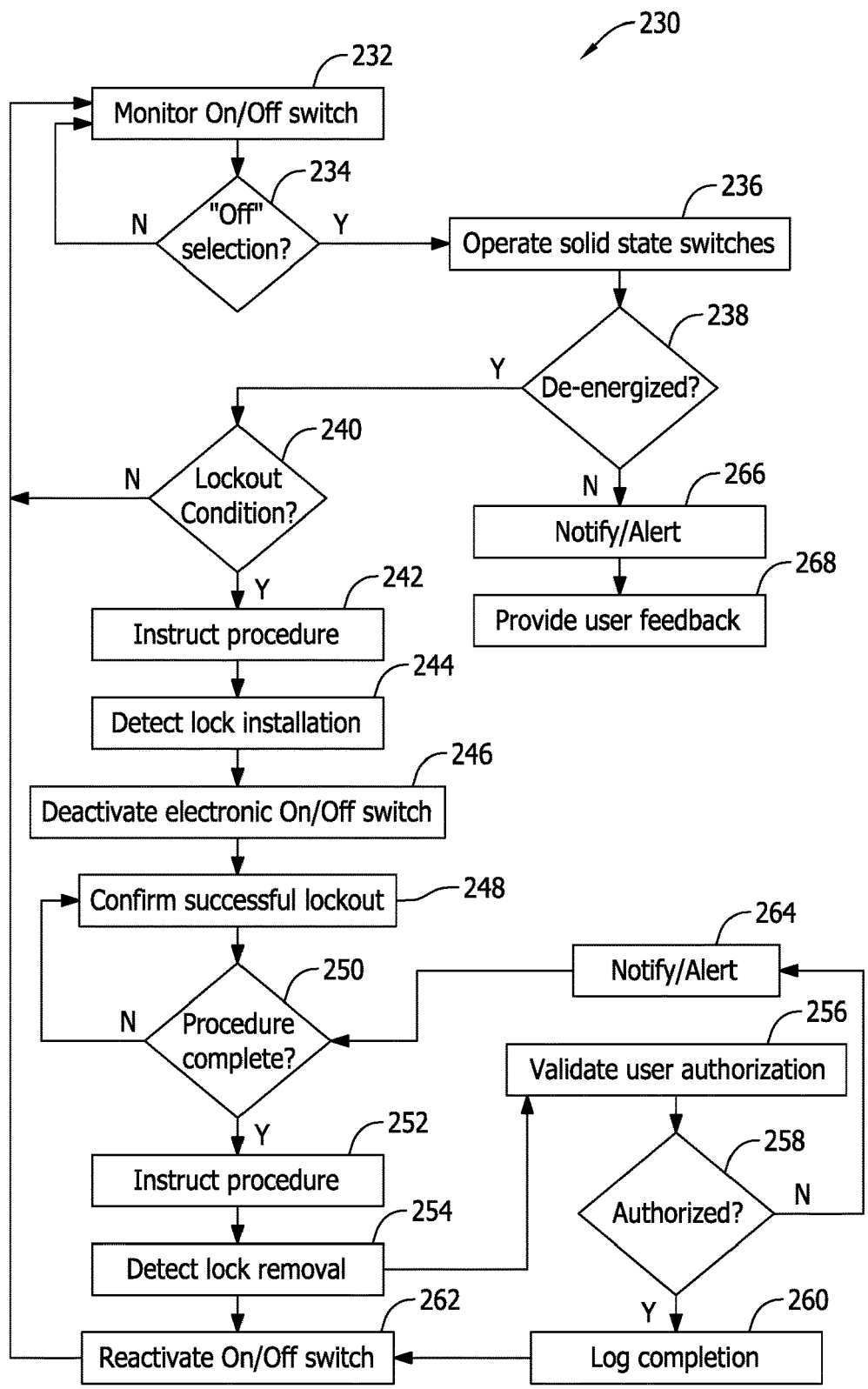
FIG. 7 is an exemplary algorithmic flowchart of safety lockout activation and deactivation processes for the device shown in FIGS. 4-6.

FIG. 7 is an exemplary algorithmic flowchart of safety lockout activation and deactivation processes 230 for the device 100. The algorithmic processes may be implemented, for example, by the processor-based controls including the processor 150 and the applicable sensors included in the device controls, or by equivalent controllers in view of the various sensors provided to detect the state or position of mechanical or electronic input selectors as they relate to voltage or current readings at different locations in the device, and other considerations discussed below.

At step 232, an on/off input element is monitored in the device 100, such as the toggle switch 182 (FIGS. 4-6) or other input selector. At step 234, it is determined whether the on/off switch is in the off position as an input selection of user intent to turn the device 100 off to effect the disconnection of the load-side circuitry and electrical loads through the device 100. When non-mechanical input selectors are provided, at step 232 the activation of the input elements may be monitored as the user selects them to change the state of the device from on to off, or from off to on.

If the on/off input element is not in the off position at step 234, the algorithm returns to step 232 and continues to monitor the on/off input element. Unless the on/off input selector is determined to be "off", it may be assumed that normal "on" operation of the device 100 connecting the line-side and load-side circuitry through the device 100 is desired and no further action is required.

If the on/off input selection is determined to be "off" at step 234, the device proceeds to operate the solid state switches at step 236 to become nonconductive, such that current can no longer flow through the solid state switches to the load-side terminals and the desired disconnection is realized. For purposes of step 236, operation of the solid state switches refers to the operational controls and actions needed to affect the change of state from a current conducting state to a non-current conducting state of the solid state switches provided. For example, the operation of the solid state switches refers to the necessary voltage change to the gate-emitters of the solid state switches to reach the non-conductive state of each solid state switch.

At step 238, the processor 150 may confirm whether the load-side terminals of the device 100 are actually electrically isolated and de-energized via the sensors provided in the device 100. For instance, the load-side terminals of the device 100, if truly isolated as desired, will have zero voltage and zero current detections from the applicable sensors. If non-zero voltage and current is found to exist, the load-side terminals of the device 100 are not isolated as intended, and at step 266 the processor may generate a notice or alert to a local user interface (e.g., the display 116 described above) and any pertinent remote user interfaces. At step 268, feedback to the user is provided to visually show the user that the device 100 remains on and not off. A user observant to the feedback provided will therefore see that there is a problem with the device 100 that needs attention in order for the load-side circuitry to actually be turned off as intended.

If the processor 152 confirms that the load-side terminals of the device 100 are actually electrically isolated and de-energized at step 238, a prompt may be presented on the local user interface (e.g., the display 116) whether a safety lockout is desired at step 240. If no, the algorithm returns to step 232 and may continue to check to see if the isolation is maintained. The algorithm therefore acknowledges that at times disconnection may be desired, but no safety lockout is needed as the disconnection was not made in view of maintenance or service tasks to be performed on the load-side. The prompt at step 240 also reminds the user that safety lockout is available if needed, but requires activation by the user.

If the safety lockout is desired at step 240, at step 242 the user may be presented a lockout instruction, such as, for example, to insert and install a locking element as described above with respect to the exemplary padlocks. Step-by-step lockout instructions may be provided in the case where multiple and different types of lockout components are provided. At step 244, the installation of the lock as instructed may be detected, and in response to the detection the on/off input element may be deactivated or disabled to render the on/off input element non-responsive to actually turn the device 100 back on and effect the change of state of the solid state switch elements. At step 248, confirmation may be provided to the user that the safety lockout is successfully activated. Workers may therefore safely proceed to perform tasks on the electrical loads and load-side circuitry.

At step 250 the device awaits completion of the load-side procedures being performed, continues to confirm that electrical isolation is maintained, and provides confirmation of the lockout activation. Instruction may be provided at step 252 to the user regarding deactivation of the safety lockout in order to turn the device back on, including the removal of any mechanical locks or deactivation of electronic locks. Step-by-step lockout deactivation instructions can be provided for each type of lockout component provided in the device 100.

At step 254, a mechanical lock removal may be detected. At step 256 a user validation or authorization to disable any electronic locks is received, such as the aforementioned passcode. If at step 258, the validation received is determined to be authorized, at step 260 the deactivation of the safety lockout event is logged. At step 262 the on/off input element is reactivated. The user may now reclose the device with the on/off input element, and in response the device controls will operate the solid state switches to become conductive and re-connect the load-side circuitry through the device 100.

If at step 258, the validation received is not authorized, a notice or alert is generated to remote devices and persons that a possible improper attempt to reclose the device 100 was made. Investigation of such occurrence may therefore be made.

Depending on the type and number of lockout components and features provided in the device 100, appropriate modification of the algorithm and processes shown and described are now believed to be apparent. Certain steps as shown and described would not be performed if certain of the lockout types described above were not provided in the device 100. Likewise, further steps could be undertaken to accommodate additional types of lockouts as desired or additional lockout features. While specific examples of processes are therefore set forth above in relation to exemplary embodiments, similar effect and benefits could otherwise be realized using other equivalent processes to accommodate additional or alternative mechanical locking features, various types of local and remote user interfaces, various different types of sensors to detect mechanical locking elements, and various forms of user authorization and validation.

Figure 8:
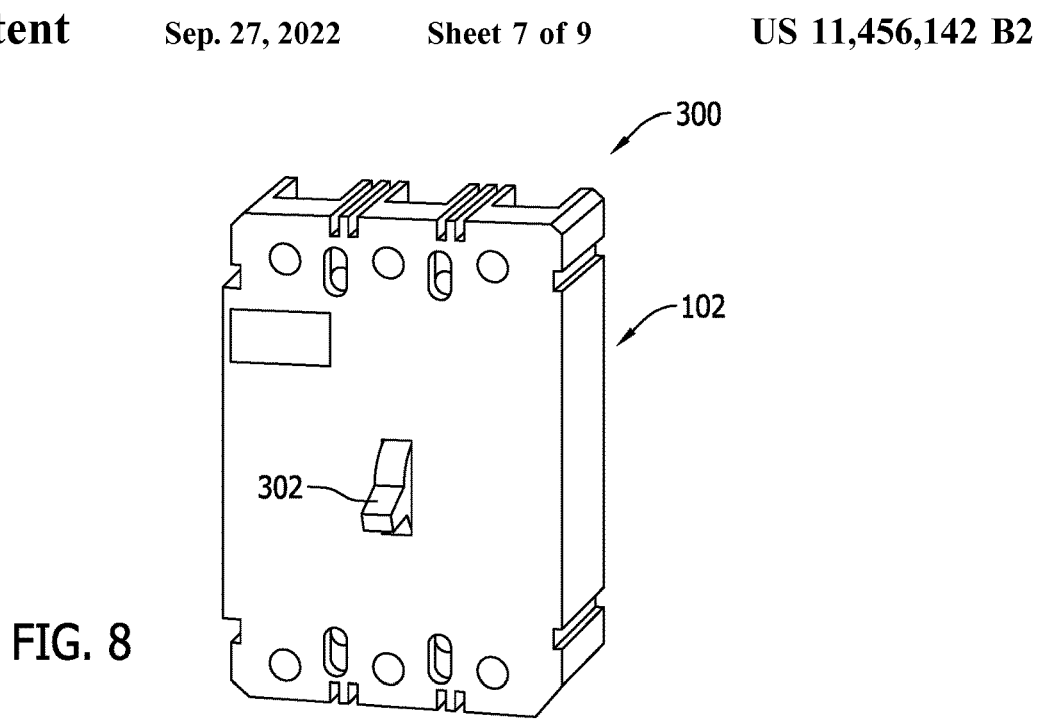
FIG. 8 is a perspective view of a compliant, hazardous location arc-less circuit protection device according to a second exemplary embodiment of the invention.

FIG. 8 is a perspective view of a compliant, explosive location circuit protection device 300 according to another exemplary embodiment of the invention. The circuit protection device 300 includes the housing 102 described having the chemical resistance, impact resistance and thermal management features described above in relation to the device 100, but omits the digital display 116 of the device 100 (FIG. 1). As shown in FIG. 8, a mechanical toggle switch 302 is accessible to a user on the upper front face of the housing 102 for manual activation of the device 300 between "on" and "off" states to connect and disconnect the load-side of the device 300 from the line-side. Manual actuators other than toggle switches may be employed in other embodiments. In some cases, the display 116 could be provided in addition to or in lieu of the toggle switch 302 or another manual actuator. Any of the safety lockout features described above may be employed in the device 100, separately or in combination.

Like the device 100, the device 300 may interconnect line-side or power supply circuitry and electrical loads operating via alternating current (AC) or direct current (DC). The device 300 as shown is configured as a circuit breaker and therefore provides automatic circuit protection in response to predetermined overcurrent conditions, which may be selected by the user within a certain range and input to the device a local or remote user interface, or otherwise pre-programmed into the device. The device 300 may operate according to specified time-current curves or time-current profiles suitable to provide adequate protection for connected loads.

Figure 9:
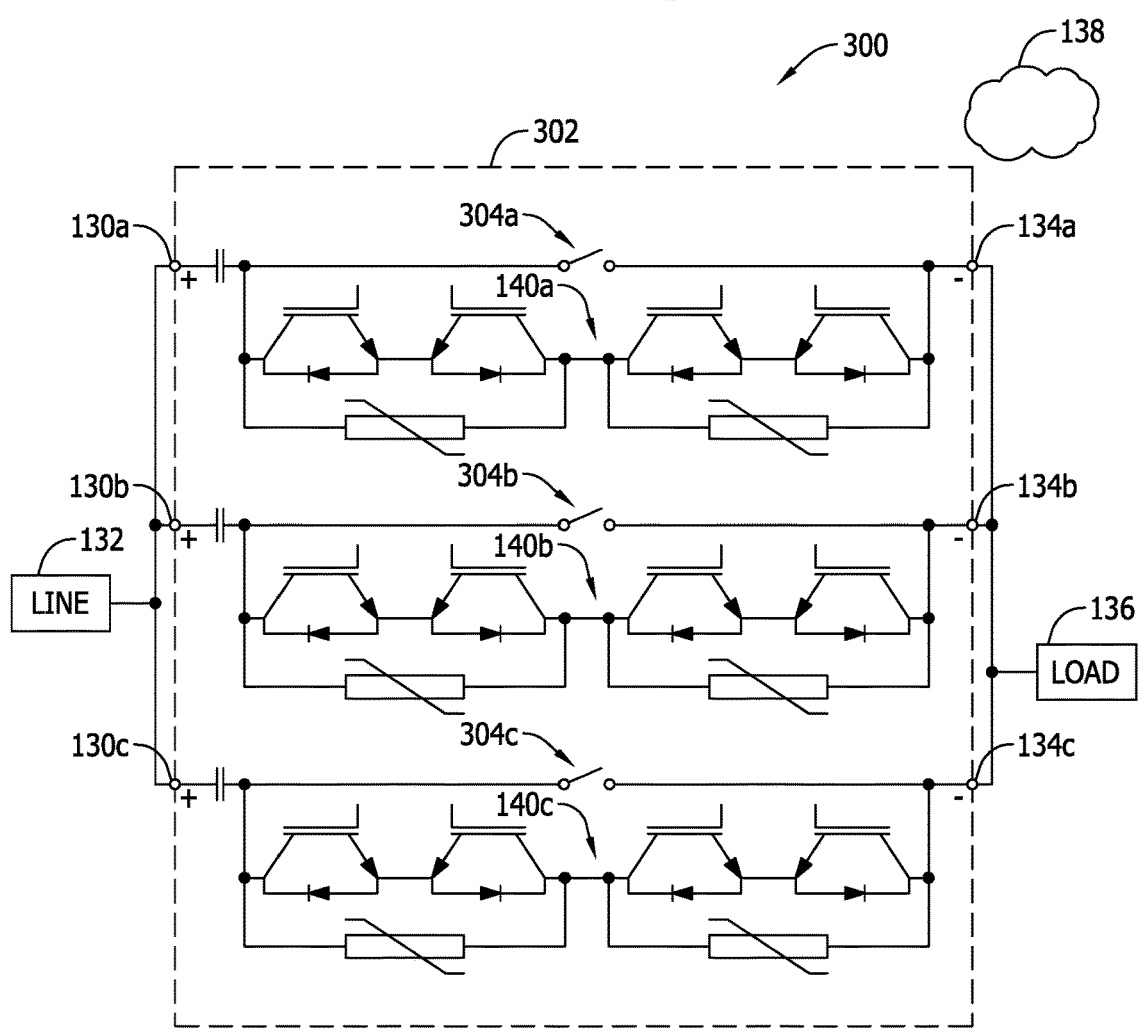
FIG. 9 is a simplified schematic diagram of the circuit protection device shown in FIG. 8 in an exemplary hybrid configuration.

FIG. 9 is a simplified schematic diagram of the circuit protection device 130 in an exemplary hybrid configuration. The device 300 includes input terminals 130*a*, 130*b*, 130*c* each connected to one phase of a three-phase power supply indicated as line-side circuitry 132 via connecting cables or conduits. The device 300 further includes output terminals 134*a*, 134*b*, 136*c* providing each connected to load-side circuitry 136 such as motors, fans, lighting devices, and other electrical equipment in an industrial facility wherein ignitable gas, vapors or substances may be airborne as indicated at 138 to produce an explosive environment.

In between each pair of input terminals 130a, 130b, and 130c, and output terminals 134a, 134b, and 136c are mechanical circuit breakers 304a, 304b, and 304c and parallel connected solid-state switch devices arranged as indicated at 140a, 140b and 140c. The exemplary solid-state switch arrangement 140a, 140b, and 140c includes series-connected pairs of insulated-gate bipolar transistors (IGBTs) with each pair including a varistor element connected in parallel to the IGBTs as described above. While exemplary solid-state switching arrangements are shown and described, others are possible to achieve solid-state switching functionality in an arc-less manner. As discussed above, the solid-state switching devices operate in an arc-less manner and therefore do not themselves present a risk of ignition insofar as arcing is concerned in a hazardous location.

The combination of the mechanical circuit breakers 304a, 304b, and 304c and the solid-state switching arrangements 140a, 140b and 140c can improve response times of the device 300 relative to that of the device 100. The mechanical circuit breakers 304a, 304, and 304c however, operate with mechanical switch contacts and accordingly deserve some attention to a hazardous location application as arcing can be an ignition source. The solid-state switching arrangements 140a, 140b and 140c that are connected in parallel to the mechanical circuit breakers 304a, 304b, and 304c can limit the current in mechanical circuit breakers 304a, 304, and 304c in an overload or short circuit event to reduce intensity of any arc produced to a level below that required to present an ignition concern, or otherwise preclude arcing altogether.

The device 300 may likewise connected to electrical ground 146 to dissipate any charging of the housing surface as described above, thereby precluding a possible ignition source via static discharge as described above. In contemplated embodiments, the housing 102 of the device 300 may be fabricated from metallic or non-metallic materials. In some cases involving certain metallic or non-metallic materials, strategic selection of housing materials, filler materials and encapsulant materials is necessary in order to address static electricity concerns. Combinations of conductive and non-conductive materials, both internal to the device 300 and external to the device 300 may be utilized to provide paths to electrical ground as appropriate.

The device 300 is likewise connected to an electrical ground 146 to dissipate any charging of the housing surface as described above, thereby precluding a possible ignition source via static discharge. The line and load-side connections may be established using secure terminal assemblies including but not limited to locking terminal features to prevent loosened connections over time after initially being secured with a fastener, and connections made to enclosed terminals via armored cable and cable glands to provide enhanced safety assurance for explosive environments.

Figure 10:
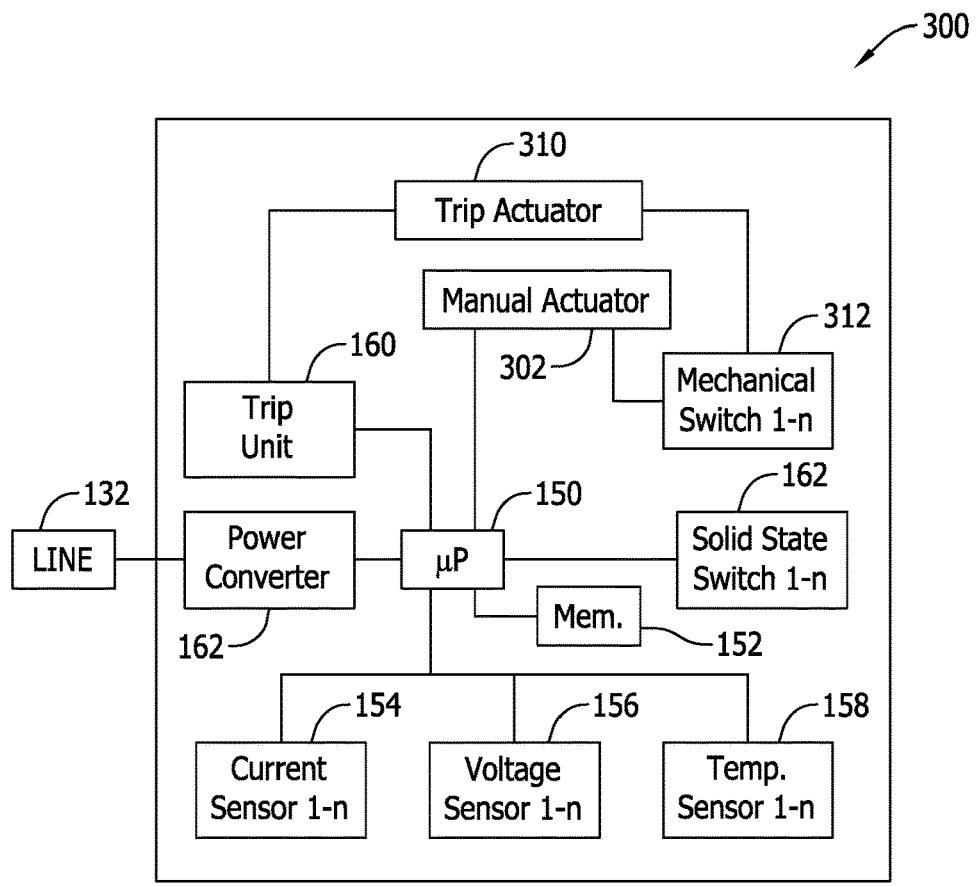
FIG. 10 is a block diagram of the circuit protection device shown in FIGS. 8 and 9.

FIG. 10 is a block diagram of the circuit protection device 300 including, in addition to the elements described above in the device 100, control inputs for the manual actuator 302, and a trip actuator 310 for operating the mechanical circuit breakers 312 including the mechanical switches.

In the case of the device 300, mechanically actuated switch contacts are included, and therefore the toggle switch input element 302 which causes the mechanical switch contacts to open and close may be mechanically locked in an opened position to achieve a secure safety lockout for the mechanical switch contacts in the device. Confirmation and feedback to the user may be provided as described above that the mechanical switch contacts are actually opened to electrically isolate the load-side terminals. The sensors in the device 300 may also confirm that the electronic solid state switches are non-conductive and that the load-side terminals of the device are electrically isolated as desired. Error conditions can be detected if the mechanical switch contacts are opened but the electronic solid state switches remain conductive, and warnings and alerts can beneficially be generated that error conditions exists or that device malfunction has been detected. Multi-step safety lockout deactivation may be implemented as described above for a redundant degree of safety in which multiple persons are involved in different aspects to enhance the safety lockout/tagout procedures and achieve greater safety assurances for operation of the device 300 in a hazardous locations and optionally in non-hazardous locations as well.

When predetermined overcurrent conditions arise, the trip unit 160 causes the trip actuator 310 to displace the movable switch contacts and open the circuit through the device 300. The trip actuator may be an electromagnetic member such as a solenoid that can simultaneously displace the switch contacts of each mechanical breaker provided in the device 300, with the solid-state switching arrangements 140a, 140b and 140c limiting the current as the displacement of the switch contacts occurs. The manual actuator 302 can thereafter be used to reset the device 300 by closing the mechanical switches.

While an exemplary device architecture has been described for the device 300, it is understood that certain of the elements shown in FIG. 10 may be considered optional to provide more basic functionality, as well as additional elements could be added to realize still further sophistication and intelligence in the operation of the device 300.

Figure 11:
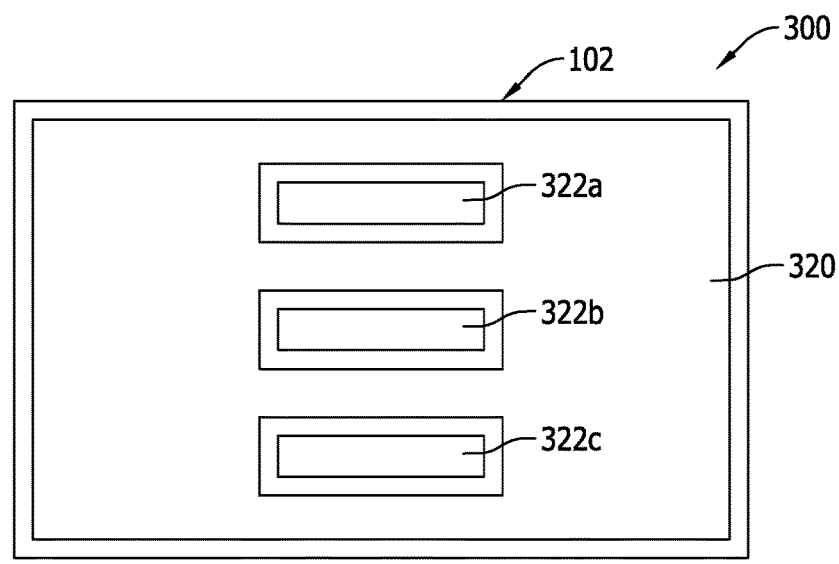
FIG. 11 diagrammatically illustrates thermal management features for the circuit protection device shown in FIGS. 8 through 10.

FIG. 11 diagrammatically illustrates thermal management features for the circuit protection device shown in FIGS. 8 through 10. While as described above the hybrid device 300 is capable of operating in an arc-less manner in many instances, but since arcing can depend on the nature of an electrical fault and the voltage and current of the operating power system at the time of the electrical fault, additional considerations to address any arcing that is realized must be considered.

As shown in FIG. 11, and in addition to the thermal management features described above in relation to the device 100, the device 300 includes additional features to ensure that any arcing that occurs in operation of the mechanical circuit breakers is isolated from the ambient environment or otherwise is reduced to a level that is insufficient to cause ignition in an explosive location. FIG. 11 illustrates the housing 102 of the device 300 defining a first or primary enclosure 320 and a series of secondary enclosures 322a, 322b, and 322c. The secondary enclosures 322 serve to contain any electrical arcing within the secondary enclosure while ensuring that airborne ignitable gases, vapors or substances cannot reach the secondary enclosures 322a, 322b, and 322c and therefore cannot be ignited by operation of the mechanical circuit breakers.

In contemplated embodiments, the secondary enclosures 322a, 322b, and 322c may be hermetically-sealed chambers that include the respective switch contacts. The hermetically-sealed chambers 322a, 322b, and 322c are fluid tight such that any ignitable element of the hazardous location that may penetrate the housing 102 into the primary enclosure 102 cannot enter the sealed chambers 322a, 322b, and 322c. The hermetically-sealed chambers may further be vacuum chambers or filled with inert gas that would reduce arcing intensity and duration, if not avoiding arcing altogether as the switch contacts are opened and closed. Each of the secondary enclosures 322a, 322b, and 322c may be provided with additional insulation and material to contain any heat associated with arcing and localize it to the secondary enclosures 322a, 322b, and 322c inside the larger enclosure 320. The enclosure within an enclosure construction of the housing 102 accommodates the other thermal management features described above, while addressing the additional concerns of the mechanical switch contacts in the explosive environment.

The secondary enclosures 322a, 322b, and 322c may be fabricated from different materials than the rest of the housing 102, or a combination of materials that may be the same or different from the remainder of the housing. Metal and plastic materials may be utilized, for example, to construct the chambers while the primary enclosure and the rest of the housing may be entirely plastic. Numerous variations are possible in this regard. The secondary enclosures 322a, 322b, and 322c may be prefabricated for assembly with the housing 102 at a separate stage of manufacture. The secondary enclosures 322a, 322b, and 322c may enclose some or all of the mechanical circuit breaker mechanism, without impeding the path of motion of the switch contacts or their ability to move.

Each of the devices 100 or 300 may be safely used in IEC Zone 1 or 2 or NEC Division 1 or 2 hazardous locations, without conventional, separately provided explosion-proof enclosures, and the enhanced safety logout/tagout features and intelligence as described above in relation to the device 100 apply equally to the device 300. The built-in ignition protection features described above either eliminate ignition sources or reduce them levels that are insufficient to cause ignition. The devices 100 or 300 are therefore sometimes referred to as being ignition-protected and therefor eliminate any need for a separate explosion-proof enclosure. As such, the devices 100 and 300 prevent the possible explosion that the explosion-proof enclosure conventionally exists to safely contain. The devices 100 and 300 can accordingly safely operate in explosive locations and obviate costs and burdens of conventional explosion-proof enclosures while saving space in the electrical power system.

Figure 12:
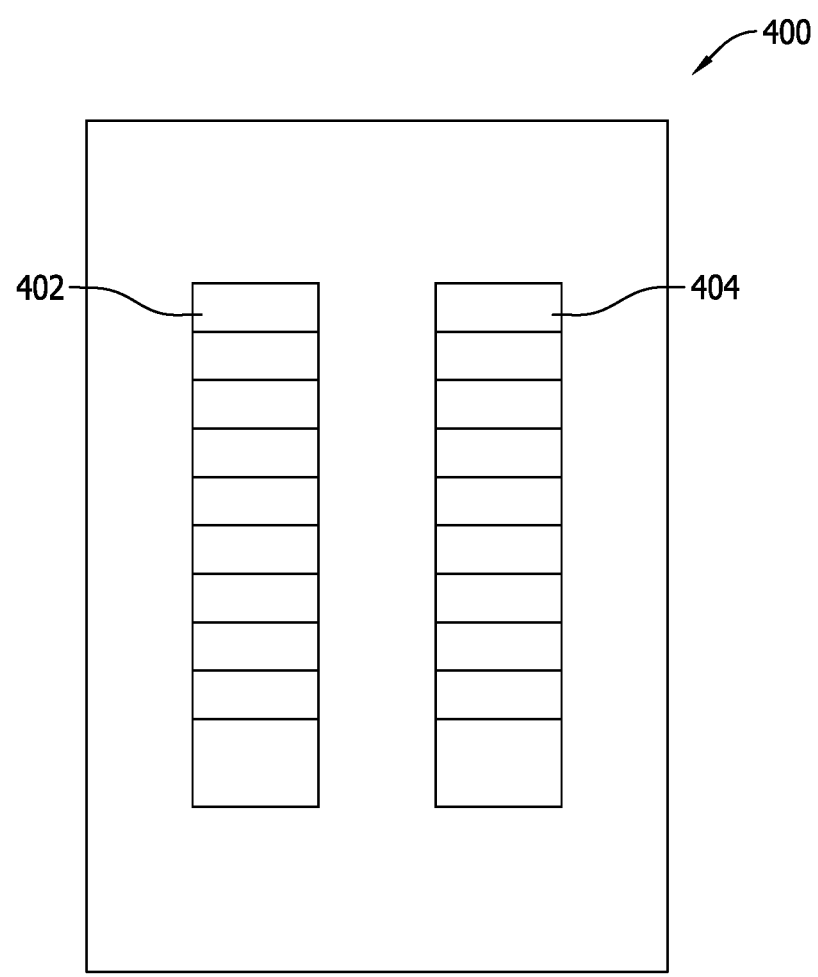
FIG. 12 illustrates an exemplary panelboard including compliant, explosive location circuit protection devices.

FIG. 12 illustrates an exemplary panelboard 400 including compliant, hazardous location circuit protection devices including an array of devices 402, 404 arranged as two columns of devices. The devices 402, 404 in each column include the devices 100 or 300 described above, and the devices 402, 404 may be represented in different ratings offering differing degrees of circuit protection to the various different loads served by the panel and its various branches. The panelboard 400 typically includes its own enclosure, but because of the ignition-protected devices 402, 404 that are used on the panelboard it can be a standard enclosure that is not designed to be explosion-proof. Because the devices 402, 404 are ignition protected, they can reside in the panel enclosure without conventional explosion-proof enclosures in the panel enclosure either. The panel enclosure provides some protection to the devices 402, 404 from environmental conditions, but no-explosion-proofing is needed by virtue of the ignition-protected devices 402, 404. Considering that known panelboards may accommodate up to 84 devices, elimination of the separately provided individual and collective explosion-proof enclosures lowers costs substantially for operation of the devices 402, 404 in hazardous locations. The costs are multiplied even further for large electrical power systems including a number of panelboards located at different locations.

Safety lockout features such as those described above may be implemented on a systems level in the panelboard assembly. For example, a separate user interface could be supplied in relation to the panel, and mechanical and electronic lockouts of the type described above may be adopted to act upon or through the panelboard user interface to disconnect all of the devices 402, 404 as a group and lockout all of the devices 402, 404 in the group via the panelboard user interface when desired, eliminating any need that may otherwise exist to individually disconnect and lockout each of the devices 402, 404. Likewise, group deactivation of safety lockout features is possible, and groups of the devices 402, 404 may be collectively turned back on via the panelboard user interface. Also, such a panelboard user interface may collectively show the on/off status or lockout status of each device 402, 404 singly or in groups. To the extent that the devices 400, 402 may be desirably used individually to disconnect only selected ones of the connected electrical loads through the individual devices 402, 404 in the panel, the panelboard user interface may likewise present status and confirmation of the state of the devices 402, 404. For example, considering n circuits connected through the panel, circuits 1, 7, 12 and 19 in the panel may be locked out via the selected devices 402, 404 with a single lock (implemented through the panel rather than the individual devices), simultaneously preventing the devices from being closed to energize circuits 1, 7, 12 and 19.

The thermal management concerns of device operation in a hazardous location are further multiplied in such a panelboard installation including numerous devices 402, 404 operating simultaneously and in close proximity to one another. Heat effects can accumulate and adjacent devices may run hotter (i.e., with higher surface temperatures) than they would if used individually, or at least spaced farther apart from one another. When the panelboard includes an enclosure, without necessarily requiring an explosion-proof enclosure, the devices 402, 404 in the upper portions of the columns may further run hotter than devices 402, 404 in the lower portions of the enclosure as the heat rises from the lower situated devices 402, 404. In some instances then, active cooling features and systems may be advisable to avoid undesirable temperature effects on the operation some of the devices 402, 404 or to address elevated surface temperatures. As mentioned above, an active cooling system could be provided on or in relation to the panelboard to cool devices 402, 404 at a systems level, as opposed to individually. Variations and combinations of active cooling elements and systems are possible to achieve different cooling effects. The active cooling system could be triggered by ambient temperate sensing, temperature readings from any of the temperature sensors provided in the devices 402, 404, or in view of other factors and consideration to run only on-demand as actually needed, or may alternatively be run continuously or intermittently as needs dictate.

While a panelboard and panelboard enclosure are described above for the devices 402, 404, similar benefits may be realized in motor control centers and other locations in an electrical power system wherein circuit protection devices 402, 404 are likewise conventionally located in non-explosion-proof enclosures. Considering the sensors and intelligence provided in the devices 402, 404 and motor-inrush features provided in the devices 402, 404 additional motor startup components could be integrated in the design of the devices 402, 404 and provide a combination circuit protector/motor starter in a single package, as opposed to conventionally provided, separately packaged and series connected circuit protectors and motor starter assemblies that each require explosion-proof enclosures for use in hazardous locations. Other dual purpose or dual function devices 402, 404 are likewise possible that reduce costs of installing and servicing electrical power systems even further by reducing the number of devices that need to be acquired, installed, and serviced in the power system.

The solid state or hybrid devices such as those described above may be constructed using various different solid state switching elements, arrangements of solid state switching elements, and also implemented in various different power electronics topologies. Various different embodiments are contemplated involving varying degrees of on-state loss, propensity to arcing in operation, conduction loss, component count, relative complexity, ability to meet specific response time characteristics, simplicity or complexity of operating algorithms, and ability to integrate motor soft-starting or other features when desired. Solid state switching elements can be connected in series or in parallel to achieve desirable voltage rating scaling or desirable current rating scaling using modular arrangements. To the extent that by-pass contacts are desirably implemented, encapsulation materials and thermal management features for the by-pass contact(s) provided may be advisable.

Any of the solid state and hybrid switch arrangements shown and described above may include or be connected to line-side electrical fuses to enhance circuit protection assurance by addressing any deficiency or the solid state switching elements with respect to certain overcurrent conditions or to improve response times to certain operating conditions.

The device construction and safety lockout/tagout features described above can easily be applied to realize circuit protection devices that are not circuit breaker devices, but are nonetheless ignition protected for use in NEC Division 1 or 2 hazardous locations, as well as IEC Zone 1 or 2 locations, without explosion-proof enclosures. For example fusible switch disconnect devices are discussed above that include mechanical switches in combination with fuses. Applying the chemical and impact resistant housing constructions, arc-free switching operation, secure terminal assemblies and thermal management features described, a solid-state fusible switch disconnect device or a hybrid fusible switch disconnect device can easily be constructed with similar benefits, but offering a different degree of circuit protection.

Likewise, the chemical and impact resistant housing construction, arc-free switching operation, safety lockout/tagout features and certain of the thermal management features described above can easily be applied to realize switching devices that do not themselves provide overcurrent circuit protection, but are nonetheless ignition protected for use in NEC Division 1 or 2 hazardous locations or IEC Zone 1 or 2 locations, without separately provided explosion-proof enclosures. For example, mechanical relay switches and contactors are known that provide disconnection functionality without capability to independently operate and protect against overcurrent conditions. Applying the chemical and impact resistant housing construction, arc-free switching operation, safety lockout/tagout features and thermal management features described, a solid-state relay device or a hybrid relay device, and a solid-state contactor device or a hybrid contactor device can easily be constructed for safe operation in an explosive environment with intelligent lockout detection capability, lockout detection, and confirmation.

Ignition-protected devices such as those described can be provided with any desired number of switching poles, including for example only single pole devices, two pole devices, three pole devices, and four pole devices to accommodate the needs of any type of power systems, including multiphase power systems and polyphase power systems, while universally providing ignition protection for use in NEC Division 1 or 2 locations or IEC Zone 1 or 2 hazardous locations.

Having described devices and applicable operating algorithms functionally per the description above, those in the art may accordingly implement the algorithms via programming of the controllers or other processor-based devices. Such programming or implementation of the algorithmic concepts described is believed to be within the purview of those in the art and will not be described further.

The benefits and advantages of the inventive concepts are now believed to have been amply illustrated in relation to the exemplary embodiments disclosed.

An embodiment of a compliant switch device for a hazardous location has been disclosed. The compliant switch device includes an ignition protected housing, a line-side terminal and a load-side terminal coupled to the housing, and a bus structure in the housing and including at least one solid state switching element operable in an arc-free manner to connect the load-side terminal to the line-side terminal and disconnect the load-side terminal from the line-side terminal. The switch device also includes an on/off input selector to change a state of the at least one solid state switching element, and a controller monitoring a state of the on/off input selector, and responsive to a change in state of the lockout input selector the controller is configured to activate a safety lockout condition disabling the on/off input selector and preventing a change in state of the at least one solid state switching element via the on/off input selector, whereby the switch device is compliant for use in the explosive environment without requiring a separately provided explosion-proof enclosure.

Optionally, the controller may also be configured to confirm a change of state of the at least one solid state switching element, and provide user confirmation of the changed state. The on/off input selector may be a mechanical input selector, and more specifically may be a mechanical toggle switch that is securable in the off position via a mechanical lock element such as a padlock.

As further options, the on/off input selector may be incorporated in an electronic display. The controller may be configured to deactivate the safety lockout condition when a predetermined passcode is provided by a user.

Also optionally, the switch device may include a detector that senses a presence or absence of a mechanical lock element for the safety lockout. The detector may be configured to sense a presence or absence of a padlock shank.

Multiple and different types of safety lockout components may be provided in the switch device. The multiple and different types of safety lockout components may be operable in combination to effect a multi-step lockout procedure. The multiple and different types of safety lockout components may include a mechanical toggle switch and a lock opening, a padlock and detector sensing a presence of the padlock, and a multifunctional display.

The switch may also include at least one mechanical switch contact in the bus structure, and the housing may include a sealed internal enclosure containing the at least one mechanical switch contact, thereby precluding the switch contact from being an ignition source in the explosive environment. The at least one at least one solid state switching element may be encapsulated. The switch device may be as a solid state overcurrent protection device, or may be configured as a hybrid overcurrent protection device. The housing of the switch device may be electrically grounded and/or exhibit anti-static properties. The housing may be chemically resistant in the hazardous location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A switch device for an explosive environment, the switch device comprising:
    an ignition protected housing;
    a line-side terminal and a load-side terminal coupled to the ignition protected housing;
    a bus structure in the ignition protected housing and including at least one solid state switching element operable in an arc-free manner to connect the load-side terminal to the line-side terminal and disconnect the load-side terminal from the line-side terminal;
    an on/off input selector to change a state of the at least one solid state switching element; and
    a controller monitoring a state of the on/off input selector, and responsive to a change in state of the on/off input selector the controller is configured to activate a safety lockout condition disabling the on/off input selector and preventing a further change in state of the on/off input selector;
    wherein the switch device is compliant for use in the explosive environment without requiring a separately provided explosion-proof enclosure.

2. The switch device of claim 1, wherein the on/off input selector is a mechanical input selector.

3. The switch device of claim 2, wherein the on/off input selector is a mechanical toggle switch.

4. The switch device of claim 3, wherein the mechanical toggle switch is securable in the off position via a mechanical lock element.

5. The switch device of claim 4, wherein the mechanical lock element is a padlock.

6. The switch device of claim 1, further comprising a detector that senses a presence or absence of a mechanical lock element securing the safety lockout condition.

7. The switch device of claim 6, wherein the detector is configured to sense a padlock shank.

8. The switch device of claim 1, wherein multiple and different types of safety lockout components are provided in the switch device.

9. The switch device of claim 8, wherein the multiple and different types of safety lockout components are operable in combination to effect a multi-step lockout procedure.

10. The switch device of claim 1, wherein the controller is further configured to confirm a change of state of the at least one solid state switching element, and provide user confirmation of the change of state of the at least one solid state switching element.

11. The switch device of claim 1, wherein the on/off input selector is incorporated in an electronic display.

12. The switch device of claim 1, wherein the controller is configured to deactivate the safety lockout condition when a predetermined passcode is provided by a user.

13. The switch device of claim 8, wherein the multiple and different types of safety lockout components include a mechanical toggle switch and a lock opening, a padlock and a detector sensing a presence of the padlock, and a multi-functional display.

14. The switch device of claim 1, further comprising at least one mechanical switch contact in the bus structure, and the ignition protected housing including a sealed internal enclosure containing the at least one mechanical switch contact, thereby precluding the at least one mechanical switch contact from being an ignition source in the explosive environment.

15. The switch device of claim 1, wherein the at least one solid state switching element is encapsulated.

16. The switch device of claim 1, wherein the switch device is configured as a solid state overcurrent protection device.

17. The switch device of claim 1, wherein the switch device is configured as a hybrid overcurrent protection device.

18. The switch device of claim 1, wherein the ignition protected housing is electrically grounded.

19. The switch device of claim 1, wherein the ignition protected housing exhibits anti-static properties.

20. The switch device of claim 1, wherein the ignition protected housing is chemically resistant in the explosive environment.

* * * * *